US007701600B2

(12) United States Patent
Fujishige et al.

(10) Patent No.: US 7,701,600 B2
(45) Date of Patent: Apr. 20, 2010

(54) IMAGE PROCESSING APPARATUS AND COMPUTER PRODUCT

(75) Inventors: Takezo Fujishige, Saitama (JP); Kiyoshi Kasatani, Tokyo (JP); Hiroshi Terui, Kanagawa (JP); Yohichi Utaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1276 days.

(21) Appl. No.: 10/855,624

(22) Filed: May 28, 2004

(65) Prior Publication Data

US 2005/0012953 A1 Jan. 20, 2005

(30) Foreign Application Priority Data

May 28, 2003 (JP) ............................. 2003-150595
Sep. 24, 2003 (JP) ............................. 2003-330881

(51) Int. Cl.
*G06F 3/12* (2006.01)
*G06K 9/54* (2006.01)
*G05B 15/00* (2006.01)

(52) U.S. Cl. .................... 358/1.15; 358/1.13; 382/303; 382/304; 700/1; 700/20

(58) Field of Classification Search ............... 358/1.13, 358/287, 401; 395/182.22; 364/492; 709/245; 361/683; 715/717, 764; 714/24; 382/303, 382/304; 700/1, 20

See application file for complete search history.

(56) References Cited

U.S. PATENT DOCUMENTS

| | | | | |
|---|---|---|---|---|
| 4,837,635 A | * | 6/1989 | Santos ........................ 358/401 |
| 5,361,134 A | | 11/1994 | Hu et al. |
| 5,367,647 A | * | 11/1994 | Coulson et al. ............. 710/105 |
| 5,448,723 A | * | 9/1995 | Rowett .......................... 714/4 |
| 5,537,626 A | * | 7/1996 | Kraslavsky et al. ............ 710/8 |
| 5,761,084 A | * | 6/1998 | Edwards .................... 700/293 |
| 5,828,823 A | * | 10/1998 | Byers et al. .................. 714/24 |
| 5,987,533 A | * | 11/1999 | Hong ............................ 710/9 |
| 6,003,068 A | * | 12/1999 | Sopko ........................ 709/205 |
| 6,061,739 A | * | 5/2000 | Reed et al. .................. 709/245 |

(Continued)

FOREIGN PATENT DOCUMENTS

EP  0 858 022 A2  8/1998

(Continued)

OTHER PUBLICATIONS

JP2002-077499 English Translation.*

(Continued)

*Primary Examiner*—Twyler L Haskins
*Assistant Examiner*—Dennis Dicker
(74) *Attorney, Agent, or Firm*—Oblon, Spivak, McClelland, Maier & Neustadt, L.L.P.

(57) ABSTRACT

An image processing apparatus includes an information processor that is controlled by a general-purpose operating system, and an image processor. The information processor performs a function in a category different from an image processing function performed in the image processor. As a result, a general purpose application program can be used as software for making effective use of the image processing function. Therefore, it is possible to facilitate development of the software to allow the image processing apparatus to perform the function in a category different from the image processing function performed in the image processor, in addition to the image processing function as a basic function.

21 Claims, 23 Drawing Sheets

U.S. PATENT DOCUMENTS

| | | | |
|---|---|---|---|
| 6,292,267 B1 * | 9/2001 | Mori et al. | 358/1.15 |
| 6,483,539 B1 | 11/2002 | Yamagishi | |
| 6,611,875 B1 * | 8/2003 | Chopra et al. | 709/245 |
| 2002/0054397 A1 * | 5/2002 | Matsushima | 358/524 |
| 2003/0011633 A1 | 1/2003 | Conley et al. | |
| 2003/0063316 A1 | 4/2003 | Irino | |
| 2004/0075856 A1 * | 4/2004 | Lay et al. | 358/1.13 |

FOREIGN PATENT DOCUMENTS

| | | |
|---|---|---|
| EP | 1 292 085 A2 | 3/2003 |
| JP | 2001-312389 | 11/2001 |
| JP | 2002-077499 | 3/2002 |
| JP | 2002-084383 | 3/2002 |
| WO | WO 97/06632 | 2/1997 |

OTHER PUBLICATIONS

U.S. Appl. No. 11/266,231, filed Nov. 4, 2005, Koakutsu.
U.S. Appl. No. 07/531,749, filed Jun. 1, 1990.
U.S. Appl. No. 07/915,878, filed Jul. 20. 1992, Fujishige.
U.S. Appl. No. 08/929,103, filed Sep. 15, 1997, Terui.
U.S. Appl. No. 09/783,594, filed Feb. 15, 2001, Kasatani.
U.S. Appl. No. 11/195,773, filed Aug. 3, 2005, Watanabe et al.

* cited by examiner

| FIG. 5 |
|---|
| FIG. 5A |
| FIG. 5B |

| FIG. 7A |
|---|
| FIG. 7B |

FIG. 13

SCREEN 1

| COMMAND BUTTON | PANEL ADDRESS IN GENERAL-PURPOSE OS | TOUCH AREA IN GENERAL-PURPOSE OS |
|---|---|---|
| XA00 | WXA00 | WXA00 WXA11 |
| XB00 | WXB00 | WXB00 WXB11 |
| XC00 | WXC00 | WXC00 WXC11 |

| COMMAND BUTTON | PANEL ADDRESS | TOUCH AREA |
|---|---|---|
| A | XA00 | XA00 XA11 |
| B | XB00 | XB00 XB11 |
| C | XC00 | XC00 XC11 |

IMAGE PROCESSING APPARATUS AND COMPUTER PRODUCT

CROSS-REFERENCE TO RELATED APPLICATIONS

The present document incorporates by reference the entire contents of Japanese priority documents, 2003-150595 filed in Japan on May 28, 2003 and 2003-330881 filed in Japan on Sep. 24, 2003.

BACKGROUND OF THE INVENTION

1) Field of the Invention

The present invention relates to an image processing apparatus and a computer product for a digital multifunction product that serves a copy function, a facsimile function, and a print function.

2) Description of the Related Art

Digital multifunction products are readily available nowadays. Digital multifunction products are some times called as digital multifunction peripherals. The digital multifunction product (MFP) is a device that serves a copy function, a facsimile (FAX) function, a print function, and a scanner function. With such a digital MFP, handwritten documents and paper materials can be electronized and thereby shared and made effective use of, through a network. In other words, this kind of digital MFP is placed as one of terminals on the network.

An input image (a document image read by the scanner function and an image input by the print function or the FAX function) is transmitted from the digital MFP to a personal computer. The input image is then sometimes distributed from the personal computer to other personal computers connected thereto through the network. In other words, if any function of controlling a process in a category different from an image processing function is to be added to the digital MFP in order to make effective use of various functions provided therein, the function of controlling the process is often added not to the digital MFP but to an external computer so that an optional function is realized in the external computer.

However, the realization of the optional function is often based on the premise that a personal computer is present on the network, but the presence of such a personal computer is not always ensured.

Japanese Patent Application Laid Open (JP-A) No. 2001-312389 discloses an image processing apparatus that includes a World Wide Web (Web) server. The Web server performs process control in a category different from a basic process in the image processing apparatus.

The whole of the image processing apparatus disclosed in JP-A No. 2001-312389 is unified into one control. Therefore, if the image processing apparatus such as the Web server performs process control in a category different from the basic process in the image processing apparatus, a control program needs to be developed so as to operate in cooperation with the image processing function. Design of such a control program as explained above is generally complicated, and therefore, the development requires enormous costs and time.

A general-purpose operating system (OS) is not used but a dedicated OS is often used for whole process control of the image processing apparatus. Therefore, the control program developed with much trouble results in a lack of flexibility. In other words, even if a general-purpose application program having the same function as a function in a category different from the image processing function of the image processing apparatus is used, a development cost cannot be reduced.

SUMMARY OF THE INVENTION

It is an object of the present invention to solve at least the problems in the conventional technology.

An image processing apparatus according to an aspect of the present invention includes an image processor that performs an image processing and includes at least one of an image forming unit and an image reading unit, wherein the image forming unit forms an image on a medium based on image data and outputs the image, and the image reading unit reads a document image; and an information processor that is controlled by a general-purpose operating system and performs a function in a category different from the image processing function.

A computer readable recording medium according to another aspect of the present invention stores a computer program that causes a method according to the present invention to be realized on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 13 is a schematic diagram of a conversion table;

DETAILED DESCRIPTION

Exemplary embodiments of an image processing apparatus and a computer product according to the present invention are explained in detail below with reference to the accompanying drawings. A digital color MFP is explained below as an example of the image processing apparatus. This digital color MFP serves the functions such as a copy function, a facsimile (FAX) function, a print function, a scanner function, and a function of distributing an input image (a document image read by the scanner function and an image input by the printer or FAX function).

Figure 1:
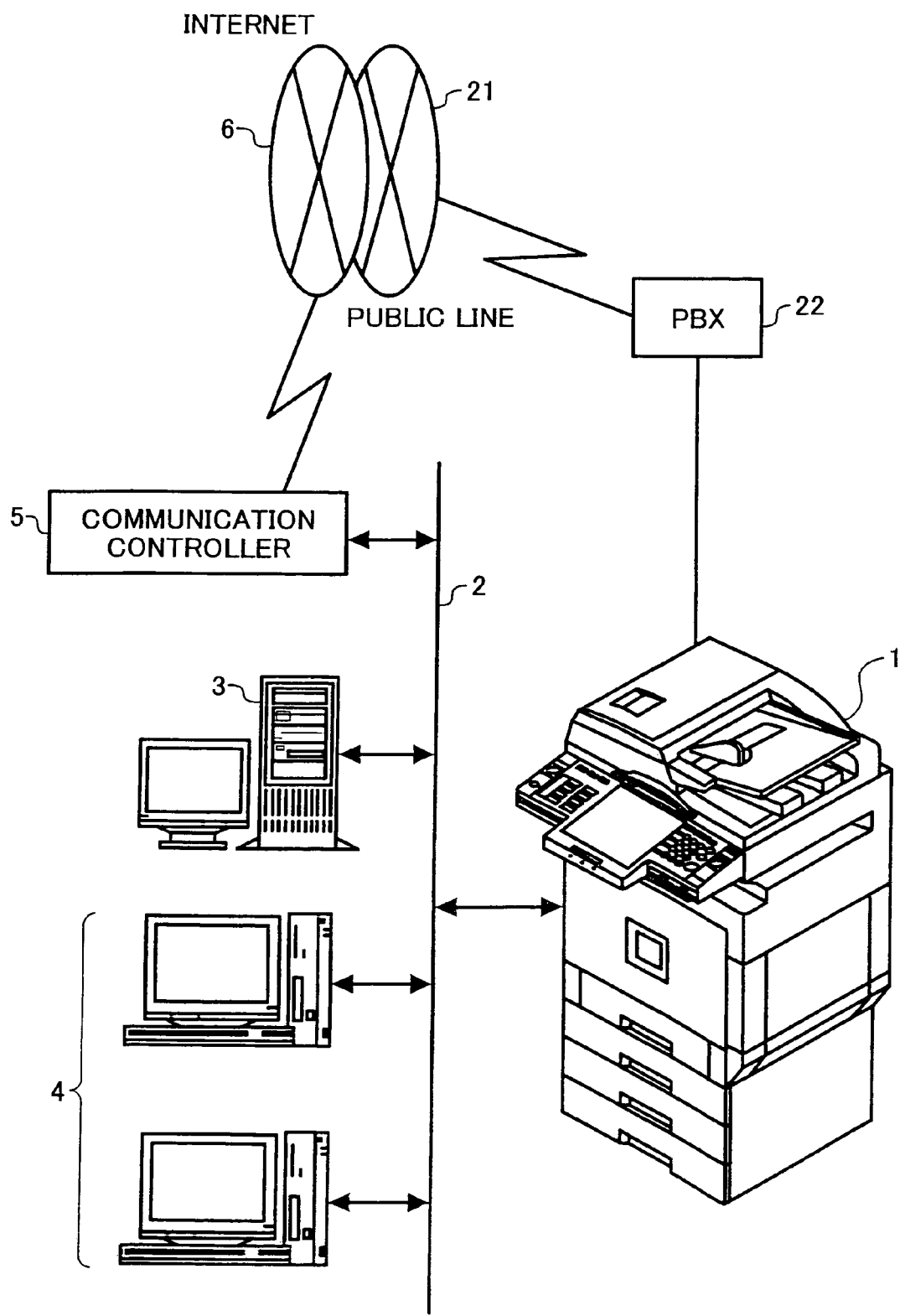
FIG. 1 is a schematic diagram of a system including a digital color MFP according to an embodiment of the present invention.

FIG. 1 is a schematic diagram of a system including a digital color MFP 1 according to an embodiment of the present invention. This embodiment is realized by the system in which a server computer 3 and a plurality of client computers 4 are connected to the MFP 1 through a local area network (LAN) 2. The server computer 3 and the client computers 4 are information processing devices that perform various information processing, and the LAN 2 is a communication network. The server computer 3 supports a file transfer protocol (FTP) and a hypertext transfer protocol (HTTP), and performs functions of a Web server and a domain name server (DNS). In other words, the environment capable of sharing the following functions on the LAN 2 is built in this system. The functions includes an image input function (scanner function), an image output function (print function), and an image processing function such as image storage function, which are included in the MFP 1.

The system is connected to an Internet network 6 through a communication controller 5 so as to allow data communications with external environments through the Internet network 6. The communication controller 5 is generally a router, a switchboard, a modem, or a digital subscriber line (DSL) modem, but any device may be used if at least Transmission control protocol/Internet protocol (TCP/IP)-based communication is possible. The LAN 2 is not limited to wired communications, but may be built by means of wireless communications (infrared rays or radio waves) or optical fibers.

Figure 2:
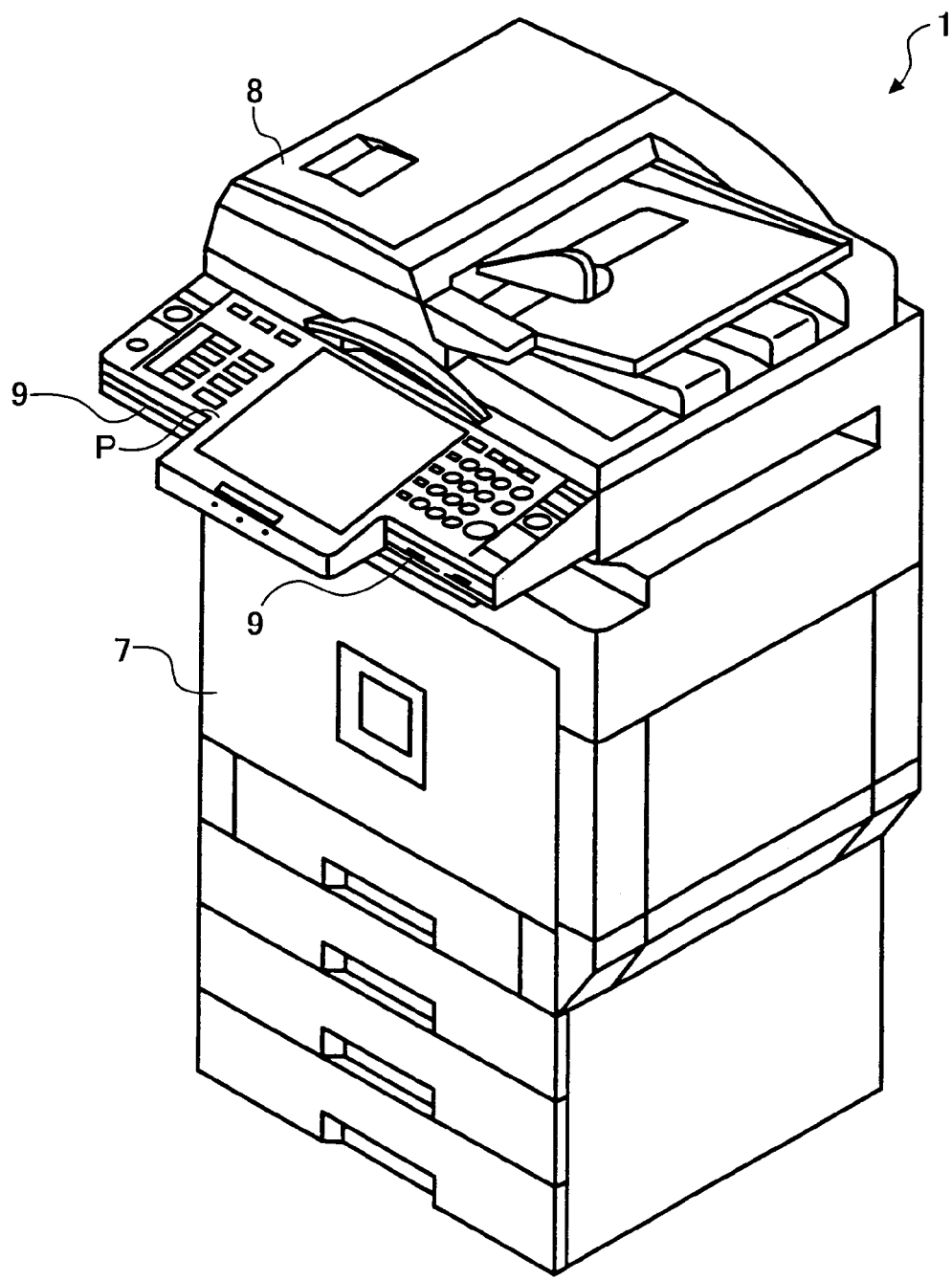
FIG. 2 is an external schematic diagram of the digital color MFP.
Figure 3:
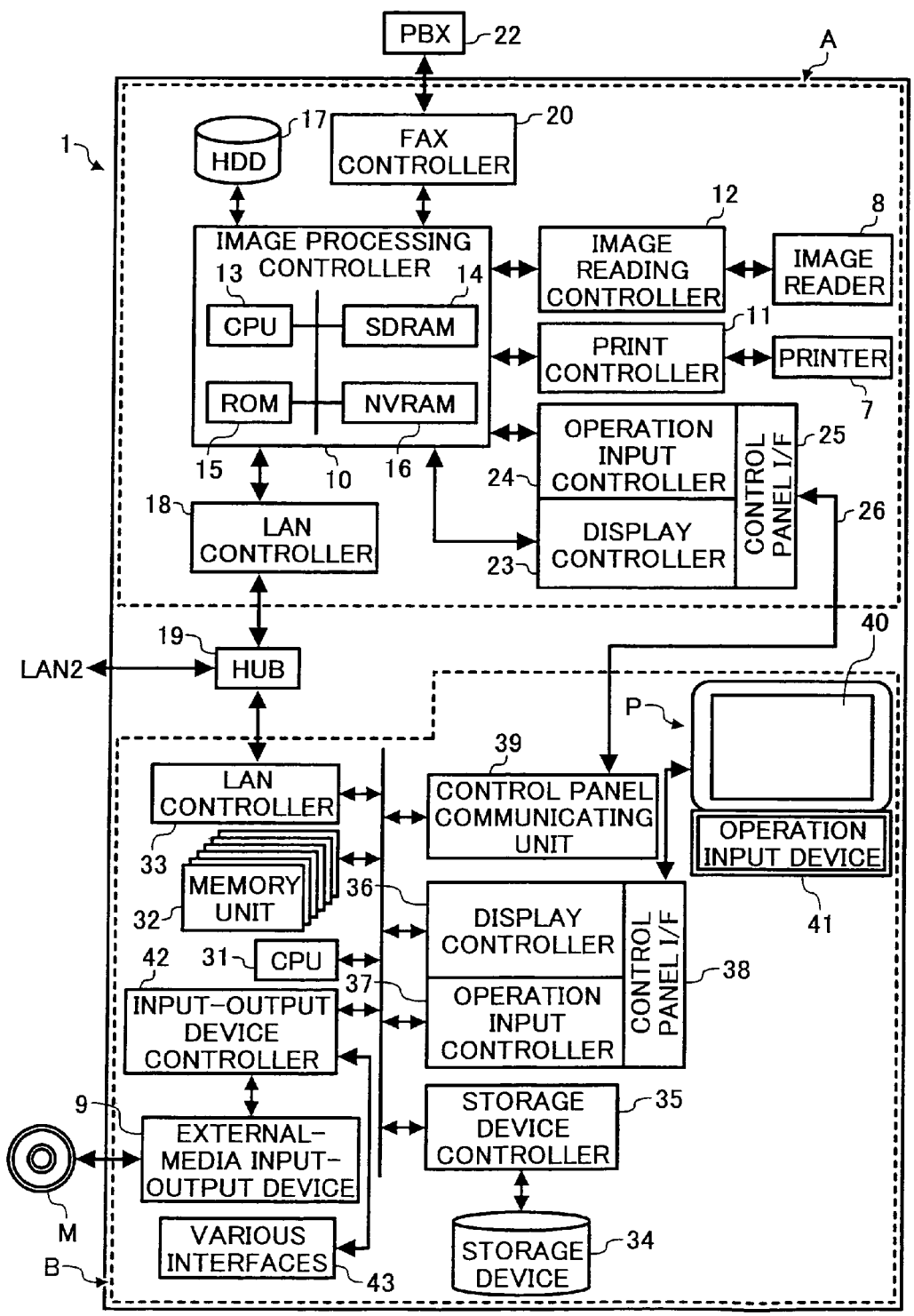
FIG. 3 is a block diagram of electrical connection of units in the digital color MFP.

The MFP 1 is explained below. FIG. 2 is an external schematic diagram of the MFP 1. FIG. 3 is a block diagram of electrical connection of units in the MFP 1. As shown in FIG. 2, the MFP 1 includes a printer 7 as an image forming unit that forms an image on a medium such as a transfer paper, and an image reader 8 as an image reading unit that reads an image from a document, the image reader 8 being provided on the printer 7. The MFP 1 also includes an operation panel P provided outside the image reader 8. The operation panel P allows a display for an operator and various inputs such as setting of a function from the operator. The MFP 1 further includes an external-media input-output device 9 provided on the lower side of the operation panel P in such a manner that a slot allowing insertion of the recording medium M is exposed to the outside. The external-media input-output device 9 reads a program code or image data from a recording medium M (see FIG. 3), and writes a program code or image data into the recording medium M.

The MFP 1 is roughly divided into two blocks, an image processor A and an information processor B as shown in FIG. 3. The image processor A includes the printer 7 and the image reader 8, while the information processor B includes the operation panel P and the external-media input-output device 9.

The image processor A is first explained below. The image processor A further includes an image processing controller 10 that performs general controls over image processing in the image processor A. The image processing controller 10 is connected with a print controller 11 that controls the printer 7, and an image reading controller 12 that controls the image reader 8.

The print controller 11 outputs a print instruction including image data to the printer 7 under the control of the image processing controller 10, and forms an image on a medium such as a transfer paper to be output to the printer 7. The printer 7 is capable of full color printing, and employs any one of printing methods such as an electrophotographic method, an ink jet method, a sublimation thermal transfer printing method, a silver salt photographing method, a direct thermal recording method, and a melting thermal transfer printing method.

The image reading controller 12 drives the image reader 8 under the control of the image processing controller 10 to cause the image reader 8 to collect light reflected from the surface of a document illuminated by a lamp to a light receiving element (e.g., charge-coupled device (CCD)) by a mirror and a lens. The image reader 8 then reads the document to obtain data, and performs analog-to-digital (A-D) conversion on the data to generate 8-bit digital image data for red, green, and blue (RGB), respectively.

The image processing controller 10 includes a central processing unit (CPU) 13 that is a main processor, and a memory device (e.g., synchronous dynamic random access memory (SDRAM)) 14 that temporarily stores the image data read through the image reader 8 to be provided for image formation by the printer 7. The image processing controller 10 also includes read only memory (ROM) 15 that stores control programs or the like, and non-volatile random access memory (NVRAM) that stores system log/system setting/log information and is capable of maintaining data when the power is off. These components communicate with one another through a bus and are configured in a microcomputer.

The image processing controller 10 is connected with a hard disk drive (HDD) 17 as a storage device that stores a large amount of image data and job hysteresis, and a LAN controller 18 that corresponds to a communication unit that connects the image processor A to the LAN 2 through a hub 19 that is a line concentrator provided in the MFP 1. The image processing controller 10 is also connected with a FAX controller 20 that controls the facsimile. The FAX controller 20 is connected to a private branch exchange (PBX) 22 communicating with a public telephone network 21, which allows the MFP 1 to communicate with a remote facsimile. The LAN controller 18 used in this case is an Ethernet board.

The image processing controller 10 is further connected with a display controller 23 and an operation input controller 24. The display controller 23 outputs an image-display control signal to the information processor B and controls an operation panel P of the information processor B so as to perform image display. The operation of the display controller 23 is performed through a communication cable 26 corresponding to communication means connected to a control panel interface (I/F) 25 under the control of the image processing controller 10. The communication cable 26 used in this case is a serial interface cable such as RS232C cable.

Therefore, the control panel I/F 25 of the image processor A and a control panel communicating unit 39 of the information processor B are connected to each other through serial interfaces.

The operation input controller 24 receives an input control signal through the communication cable 26 connected to the control panel I/F 25. The input control signal according to setting of a function or input operation by an operator is input from the operation panel P of the information processor B, and the operation is performed under the control of the image processing controller 10. In other words, the image processor A can directly monitor the operation panel P of the information processor B through the communication cable 26.

Therefore, the image processor A accesses the operation panel P of the information processor B by connecting the communication cable 26 to an image processor included in a conventional image processing apparatus. That is, the display controller 23 and the operation input controller 24 of the image processor A operate as if they are directly connected to the operation panel P.

Based on the configuration, the image processor A analyzes print data that is image information and a command to instruct printing received from an external device such as the server computer 3, a client computer 4, or a facsimile. The image processor A then bitmaps the print data so as to be printed as output image data, and analyzes print mode from the command to decide an operation. The image processor A receives the print data and the command through the LAN controller 18 or the FAX controller 20 and operates.

The image processor A can transfer print data, document-read data, output image data obtained by processing these data for output, and compressed data obtained by compressing the output image data to the external device.

Furthermore, the image processor A transfers read image data of the image reader 8 to the image processing controller 10, corrects signal degradation due to quantization of the read image data to optical and digital signals, and writes the image data to the SDRAM 14. The image data stored in the SDRAM 14 in the above manner is converted to output image data in the print controller 11, and the output image data is output to the printer 7.

The information processor B including the operation panel P is explained below. The information processor B is configured in a microcomputer controlled by a general-purpose OS that is operable generally in an information processing device such as a personal computer (PC). The information processor B has a CPU 31 that is a main processor. The CPU 31 communicates with a memory unit 32 and a storage device controller 35 through a bus. The memory unit 32 includes RAM that serves as a working area of the CPU 31, and ROM as a read only memory that stores a boot program or the like. The storage device controller 35 controls an input and an output of data in and from a storage device 34 such as a HDD that stores OS and application programs.

The CPU 31 further communicates with a LAN controller 33 that corresponds to a communication unit that connects the information processor B to the LAN 2 through the hub 19. The LAN controller 33 used in this case is an Ethernet board. An IP address that is a network address allocated to the LAN controller 33 is different from an IP address allocated to the LAN controller 18 of the image processor A. In other words, two IP addresses are allocated to the MFP 1 according to the embodiment of the present invention. That is, the image processor A and the information processor B are connected to the LAN 2, which allows data such as scanned images, facsimile images received, and status notices of the units to become exchangeable through communications using the communication protocol that is TCP/IP by means of the LAN controller 18 and the LAN controller 33.

More specifically, the image processor A and the information processor B are connected to each other by a TCP port that is inaccessible from the outside of the MFP 1. Software having a port number of the TCP port is specific to the MFP 1 according to this embodiment. Therefore, such connection interfaces of the image processor A and the information processor B allow prevention of unauthorized access from the outside of the MFP 1 by a malicious third party, which makes it possible to maintain satisfactory security.

Since the MFP 1 is connected to the LAN 2 through the hub 19, it seems that the MFP 1 is allocated with only one IP address, which allows cables to be easily handled without uglifying the MFP 1.

Figure 4:
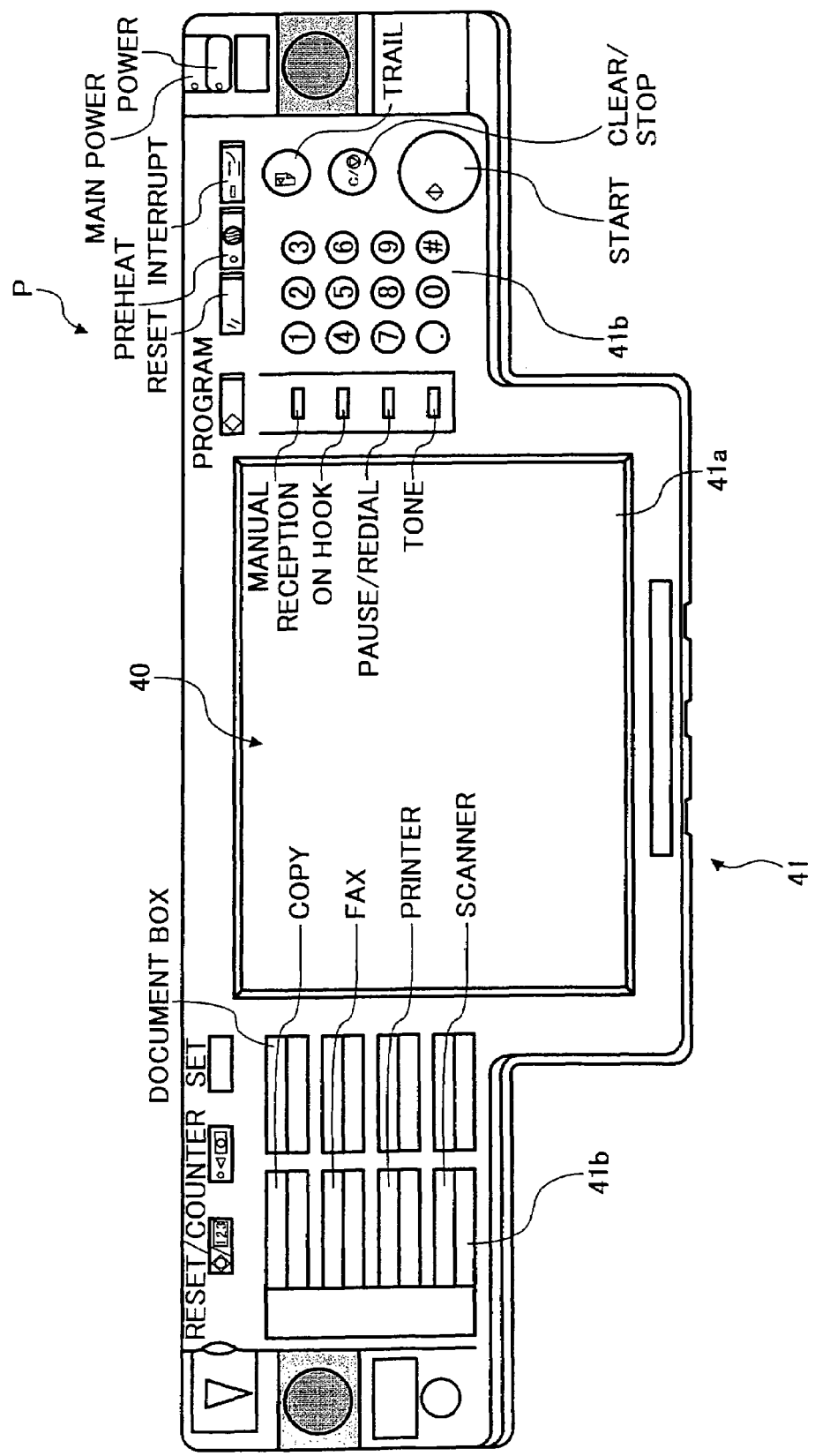
FIG. 4 is a plan view of an operation panel.

The CPU 31 communicates with a display controller 36 and an operation input controller 37 both of which control the operation panel P. FIG. 4 is a plan view of the operation panel P. The operation panel P includes a display device 40 that is, for example, a liquid crystal display (LCD), and an operation input device 41. The operation input device 41 includes a touch panel 41a that is an ultrasonic elastic wave type and is multilayered on the surface of the display device 40, and a keyboard 41b that has a plurality of keys.

The keyboard 41b includes a start key for declaring the start of image reading, a ten-digit keypad for inputting numeric values, a read-condition setting key for setting a transmission target of the read image data, and a clear key. In other words, the display controller 36 outputs an image-display control signal to the display device 40 through the control panel I/F 38, and causes the display device 40 to display a predetermined item according to the image-display control signal. The operation input controller 37 receives an input control signal according to setting of a function and an input operation by the operator by using the operation input device 41 through the control panel I/F 38.

The CPU 31 further communicates with a control panel communicating unit 39 connected to the control panel I/F 25 of the image processor A through the communication cable 26. The control panel communicating unit 39 receives the image-display control signal output from the image processor A, and transmits the input control signal through the operation panel P to the image processor A. The image-display control signal received by the control panel communicating unit 39 is subjected to data conversion for the display device 40 of the operation panel P to be output to the display controller 36. The input control signal through the operation panel P is subjected to data conversion to a format according to specifications of the image processor A to be input into the control panel communicating unit 39.

As explained above, the storage device 34 stores the OS and application programs executed by the CPU 31. In this meaning, the storage device 34 functions as a storage medium that stores the application programs. In the MFP 1, upon turning on power by a user, the CPU 31 starts the boot program in the memory unit 32, and loads the OS from the storage device 34 to the RAM of the memory unit 32 to start up the OS. The OS starts a program, reads information, or stores information according to the operation by the user. "Windows" is known as one of typical OSs. An operation program running on these OSs is referred to as an application program. The OS of the information processor B is the same as that of the information processing device (the server computer 3 or the client computer 4), that is, general-purpose OS (e.g., Windows)

As explained above, the MFP 1 includes the external-media input-output device 9 such as a flexible disk drive, an optical disk drive, a magneto-optical (MO) drive, and a media drive. The external-media input-output device 9 is a device that reads or writes program code and image data from or in a storage medium M that stores OS, various program codes (control programs) such as device drivers and various application programs, and the image data. The storage medium M includes a flexible disk, a hard disk, an optical disk (compact disk (CD)-ROM, CD-recordable (R), CD-rewritable (RW), digital versatile disk (DVD)-ROM, DVD-RAM, DVD-R, DVD+R, DVD-RW, and DVD+RW), an magneto-optical disk (MO), and a semiconductor media. The external-media input-output device 9 is controlled by an input-output device controller 42 that communicates with the CPU 31 through the bus.

Therefore, application programs stored in the storage medium M may be installed as the application programs stored in the storage device 34. Accordingly, the storage medium M is also possible to function as a storage medium that stores application programs. Furthermore, the application programs may be loaded from the outside through the Internet network 6 and LAN 2 to be installed in the storage device 34.

The input-output device controller 42 is also connected with various types of interfaces 43 such as a universal serial bus (USB), IEEE 1394, and a small computer system interface (SCSI), which allows equipment (e.g., a digital camera) to be connected thereto through the interfaces 43.

Figure 5A:
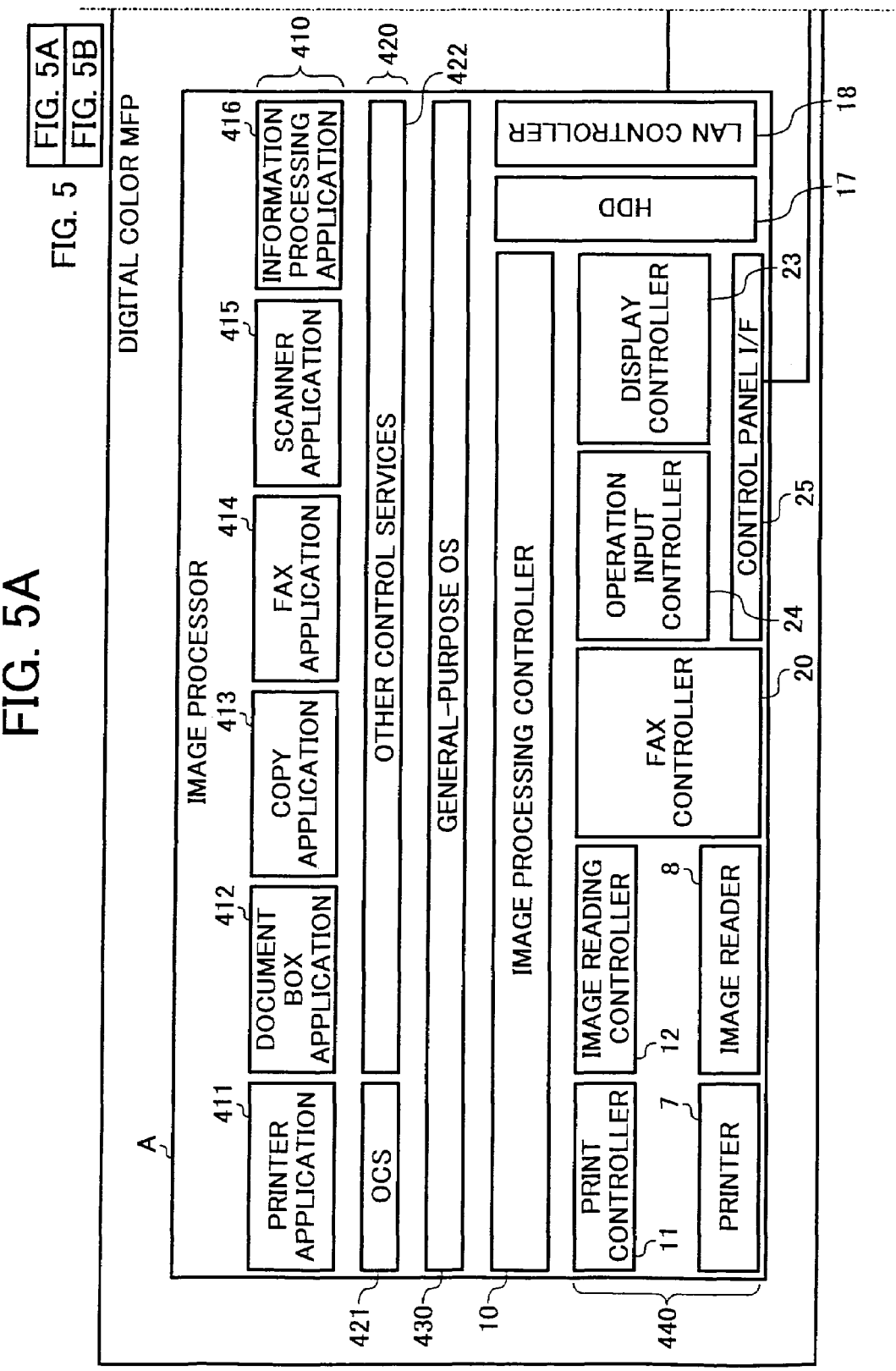
FIG. 5 is a functional block diagram of a software configuration as a main part of the digital color MFP.
Figure 5B:
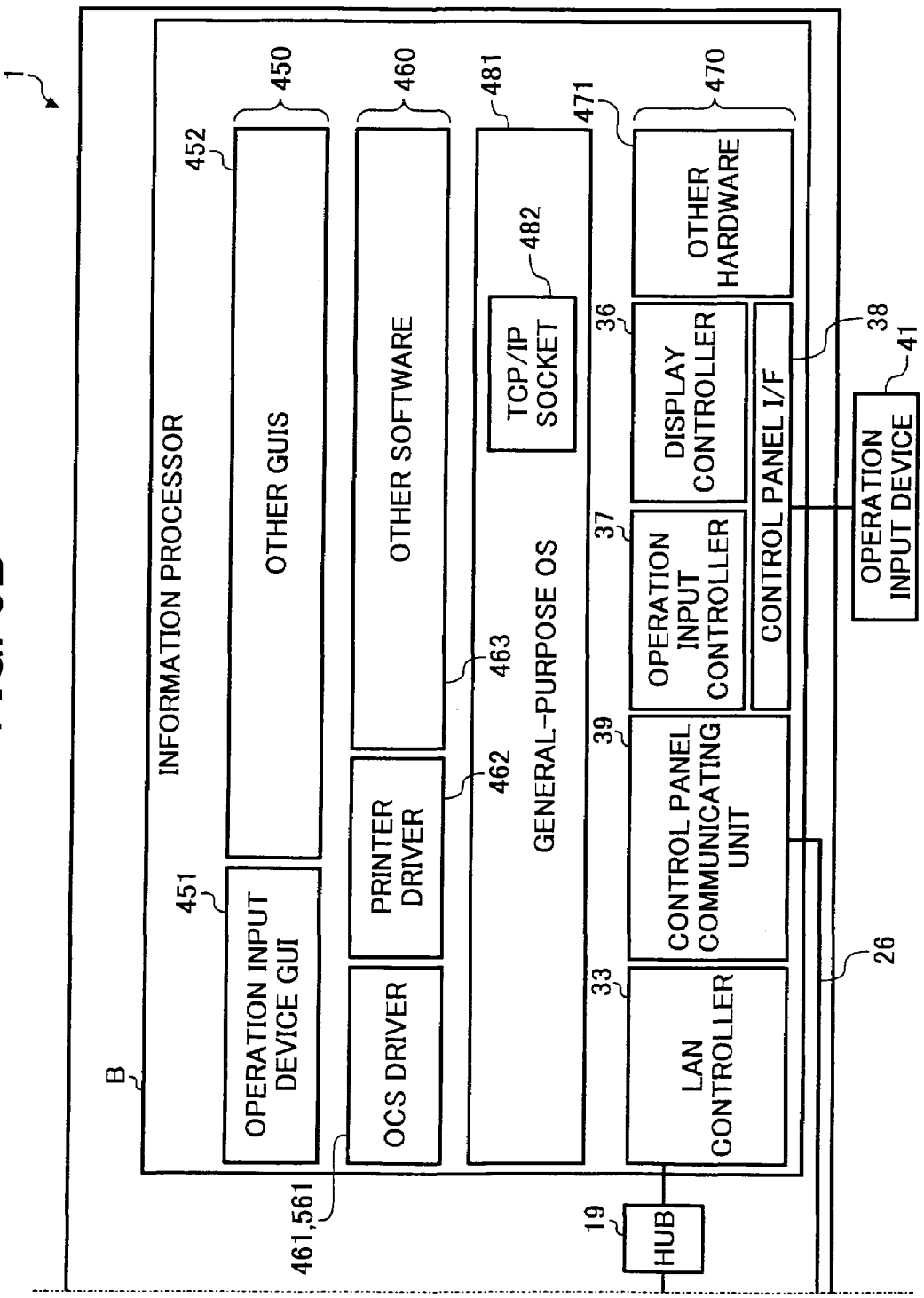

FIG. 5 is a functional block diagram of a software configuration as a main part of the MFP 1. The image processor A includes a hardware layer 440, a general-purpose OS 430, a control service layer 420, and an application layer 410.

As explained with reference to FIG. 1, the hardware layer 440 includes the image processing controller 10, the print controller 11, the printer 7, the image reading controller 12, the image reader 8, the FAX controller 20, the operation input controller 24, the display controller 23, the control panel I/F 25, the HDD 17, and the LAN controller 18.

The application layer 410 includes a printer application 411, a document box application 412, a copy application 413, a FAX application 414, a scanner application 415, and an information processing application 416. More specifically, the printer application 411 is used for the printer having a Page Description Language (PDL), a Problem Oriented Language (POL), and PostScript (PS). The document box application 412 is used to perform processing for a document box that stores scanned images in the HDD to perform various processing. The copy application 413 is used to execute copying, and the FAX application 414 is used to perform facsimile transmission/reception. The scanner application 415 is used to perform scanning, and the information processing application 416 plays a role as an interface with the information processor B. The application layer 410 may include any application other than the applications.

The control service layer 420 interprets a processing request from any of the applications to generate a request to acquire hardware resources. The control service layer 420 includes a plurality of service modules, which are divided into an operation panel control service (OCS) 421 and other control services 422.

The OCS 421 controls the operation input device 41 that is an information communicating unit for controlling between an operator (user) and the main body of the MFP 1, and corresponds to the display controller according to the present invention. The OCS 421 receives information indicating that a key has been pressed through the operation input device 41, from the information processor, and transmits the information to an application of the application layer 410. The OCS 421 transfers an image to the operation input device 41 according to a request from an application of the application layer 410 or from the other control services 422. The image is used to draw and output various screens to the operation input device 41.

The other control services 422 include a system control service (SCS), an engine control service (ECS), a memory control service (MCS), a facsimile control service (FCS), and a network control service (NCS). More specifically, the SCS manages applications, displays a system screen to the operation input device, performs light emitting diode (LED) display, manages resources, and controls an interrupt application. The ECS controls engines of the hardware layer 440 such as the printer 7 and the image reader 8. The MCS acquires and releases an image memory, uses the HDD 17, and compresses and decompresses image data. The FCS performs facsimile transmission/reception to/from an application using public switched telephone network/integrated services digital network (PSTN/ISDN), registers and cites various facsimile data managed in BKM (backup static RAM (SRAM)), and performs facsimile reading, printing of received facsimile, and performs data-combined transmission/reception. The NCS provides service that can be commonly used by applications requiring a network input-output (I/O). The control service layer 420 includes an application program interface (API) that allows reception of a processing request from the application layer 410 using a previously defined function.

The general-purpose OS 430 is a general-purpose operating system such as UNIX and Linux, and concurrently executes software of the application layer 410 and software of the control service layer 420 as respective processes.

As shown in FIG. 5, the information processor B includes a hardware layer 470, a general-purpose OS 481, a software layer 460, and a graphical user interface (GUI) layer 450.

As explained with reference to FIG. 1, the hardware layer 470 mainly includes the LAN controller 33, the control panel communicating unit 39, the operation input controller 37, the display controller 36, the control panel I/F 38, and the operation input device 41. The hardware layer 470 also includes other hardware 471 such as the memory unit 32, the CPU 31, the input-output device controller 42, the external-media input-output device 9, the various interfaces 43, the storage device controller 35, and the storage device 34.

As explained with reference to FIG. 1, the LAN controller 18 of the image processor A and the LAN controller 33 of the information processor B are connected to each other by Ethernet through the hub 19, which allows the image processor A and the information processor B to communicate with each other using the communication protocol of TCP/IP. The control panel I/F 25 of the image processor A and the control panel communicating unit 39 of the information processor B are connected to each other by serial interfaces through the communication cable 26.

The general-purpose OS 481 is a PC-operable general-purpose operating system such as Windows of Microsoft and Linux, and concurrently executes software of the software layer 460 and software of each GUI of the GUI layer 450 as respective processes. The general-purpose OS 481 also includes a TCP/IP socket 482 that is a network API for TCP/IP.

The software layer 460 includes an OCS driver 461, a printer driver 462, and other software 463.

The OCS driver 461 is a device driver for the OCS 421 of the image processor A, and allows an image related to the process control in the image processor A to be displayed on the operation input device 41, and also allows various inputs related to the process control in the image processor A to be performed through the operation input device. The OCS driver 461 corresponds to a display-device sharing unit and an operation-input-device sharing unit according to the present invention.

The printer 462 is a device driver for the printer 7, and performs processing such as conversion of drawing data to print data for the printer 7. The other software 463 may include various drivers corresponding to applications incorporated in the information processor B and the GUI, and various libraries. The libraries may be a character recognition library, an image processing library, and a Structured Query Language (SQL) database.

The GUI layer 450 controls the user interface for operations and display to the MFP 1. The GUI layer 450 includes an operation input device GUI 451 and other GUI 452.

The operation input device GUI 451 controls the user interface for input and display to the image processor A through the operation input device 41.

The other GUI 452 controls the user interface for operations and display to the information processor B.

The information processing application 416 of the image processor A is explained below. The information processing application 416 serves as a client when the information processor B serves as a server, and communicates with respective software of the information processor B using the communication protocol of TCP/IP.

Figure 6:
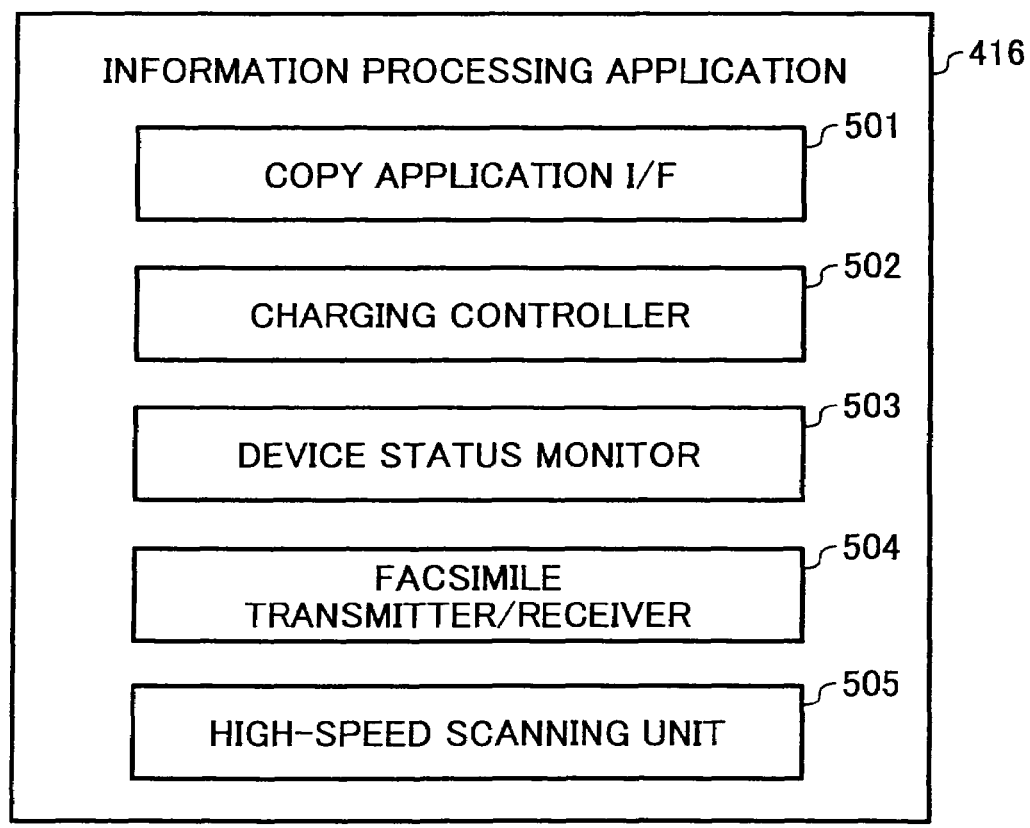
FIG. 6 is a block diagram of a functional configuration of an information processing application.

FIG. 6 is a block diagram of a functional configuration of the information processing application 416. The information processing application 416 includes a copy application I/F 501, a charging controller 502, a device status monitor 503, a facsimile transmitter/receiver 504, and a high-speed scanning unit 505.

The copy application I/F 501 serves as an interface that controls execution of processing for the copy application 413 based on a request from the information processor B.

There is a case where the information processor B includes software for performing a charging process. In this case, the charging controller 502 performs processing for charging each user by the amount of use of the image processor A and transmitting the result of the charging to the information processor B.

There is a case where the information processor B includes software for monitoring a device status. In this case, the device status monitor 503 performs processing for monitoring a status of the image processor A and transmitting the result of monitoring to the information processor B.

There is a case where the information processor B includes software for the facsimile transmission/reception. In this case, the facsimile transmitter/receiver 504 performs processing for issuing a request to transmit facsimile to the FAX application 414 based on a request from the relevant software and transmitting a facsimile image received by the FAX application 414 to the information processor B.

There is a case where the information processor B includes software for scanning. In this case, the fast-speed scanning unit 505 controls the scanner application 415 so as to execute high-speed scanning based on a request from the relevant software.

The information processing application 416 may be any interface that serves as an interface between the information processor B and software. The configuration as shown in FIG. 6 is an example, and therefore, any configuration can be employed depending on software included in the information processor B.

Figures 7, 7A:
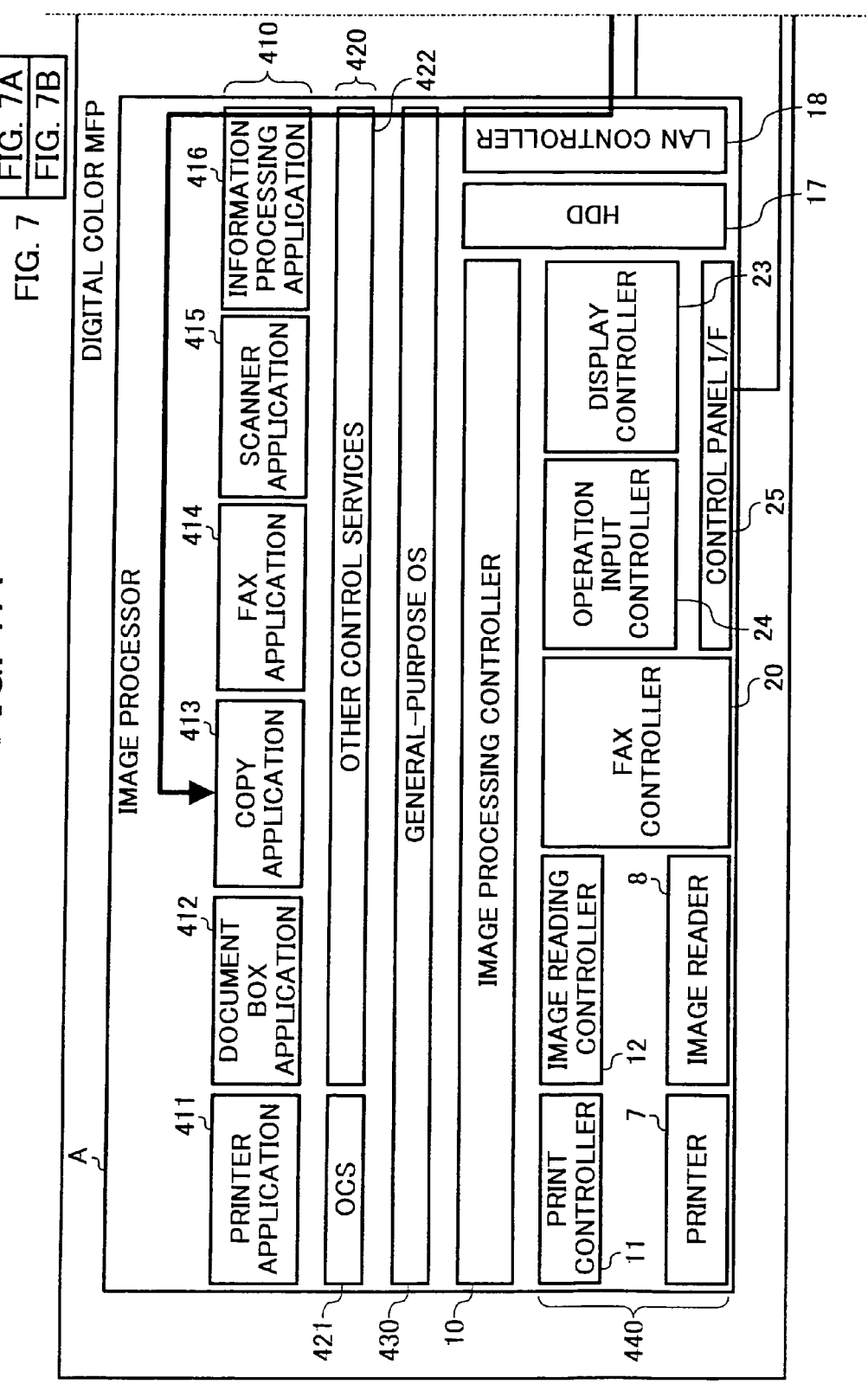
FIG. 7 is a block diagram of a data flow related to copying between an information processor and an image processor.
Figure 7B:
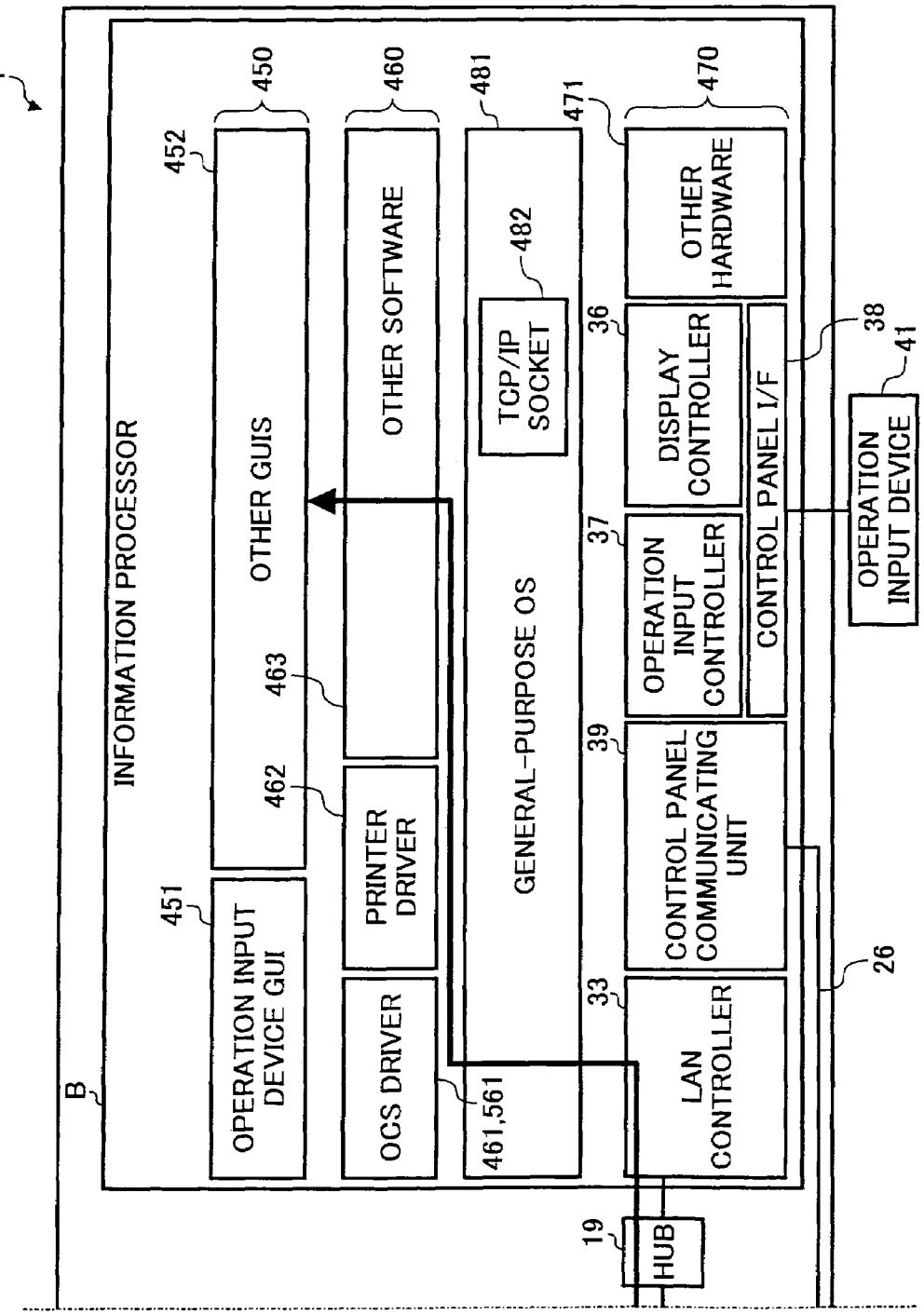

FIG. 7 is a block diagram of a data flow related to copying between the information processor B and the image processor A. An instruction related to copying and data transmission/reception are input into the copy application I/F 501 of the information processing application 416 from software related to copying in the other GUI 451 through the LAN controllers 33 and 18, and transferred to the copy application 413. The data as a result of processing output from the copy application 413 is transferred to software related to copying in the other GUI 452 in the reverse route to the route as explained above.

Figure 8:
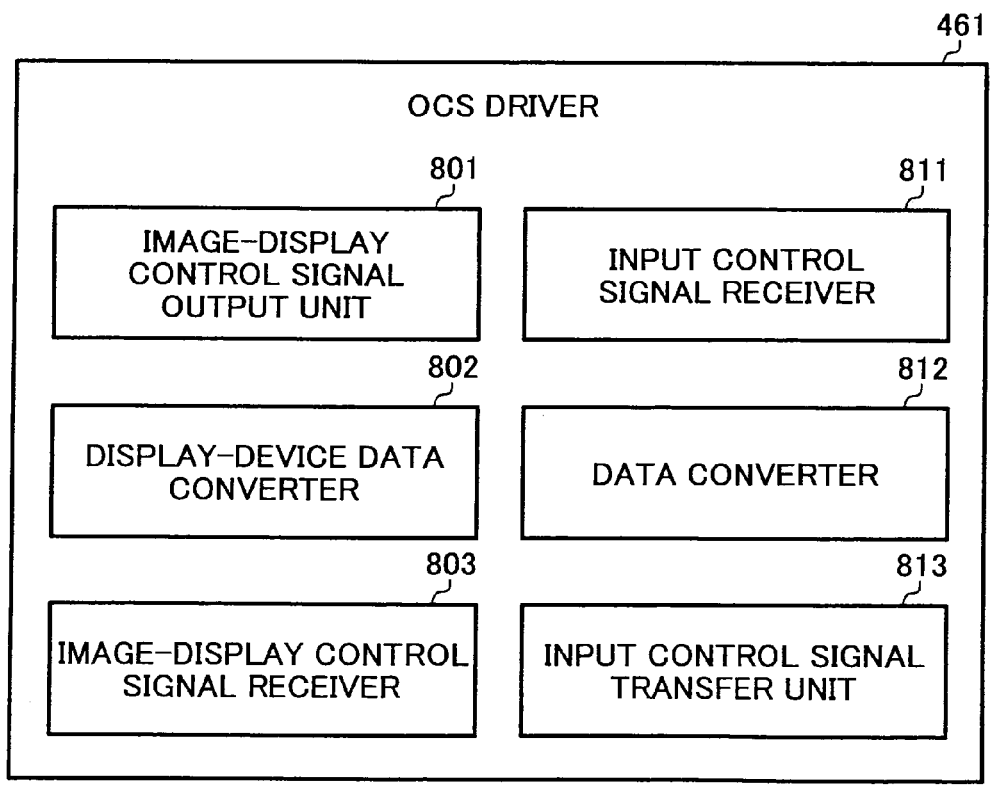
FIG. 8 is a block diagram of a functional configuration of an operation panel control service (OCS) driver.

The OCS driver 461 of the information processor B is explained below. The OCS driver 461 is a device driver for the OCS 421 of the image processor A. FIG. 8 is a block diagram of a functional configuration of the OCS driver 461.

The OCS driver 461 includes an image-display control signal output unit 801, a display-device data converter 802, an image-display control signal receiver 803, an input control signal receiver 811, a data converter 812, and an input control signal transfer unit 813.

The image-display control signal receiver 803 receives an image-display control signal output from the image processor A. The display-device data converter 802 performs data conversion on the image-display control signal to be used for the display device 40 of the operation panel P. The image-display control signal output unit 801 outputs the image-display control signal data-converted to the display controller 36 through the operation input device GUI 451.

The input control signal receiver 811 receives the input control signal from the operation input controller 37 through the operation input device GUI 451 according to setting of a function or input operation by the operator. The data converter 812 performs data conversion on the input control signal to a format according to specifications of the image processor A. The input control signal transfer unit 813 outputs the input control signal data-converted to the control panel communicating unit 39.

Figure 9A:
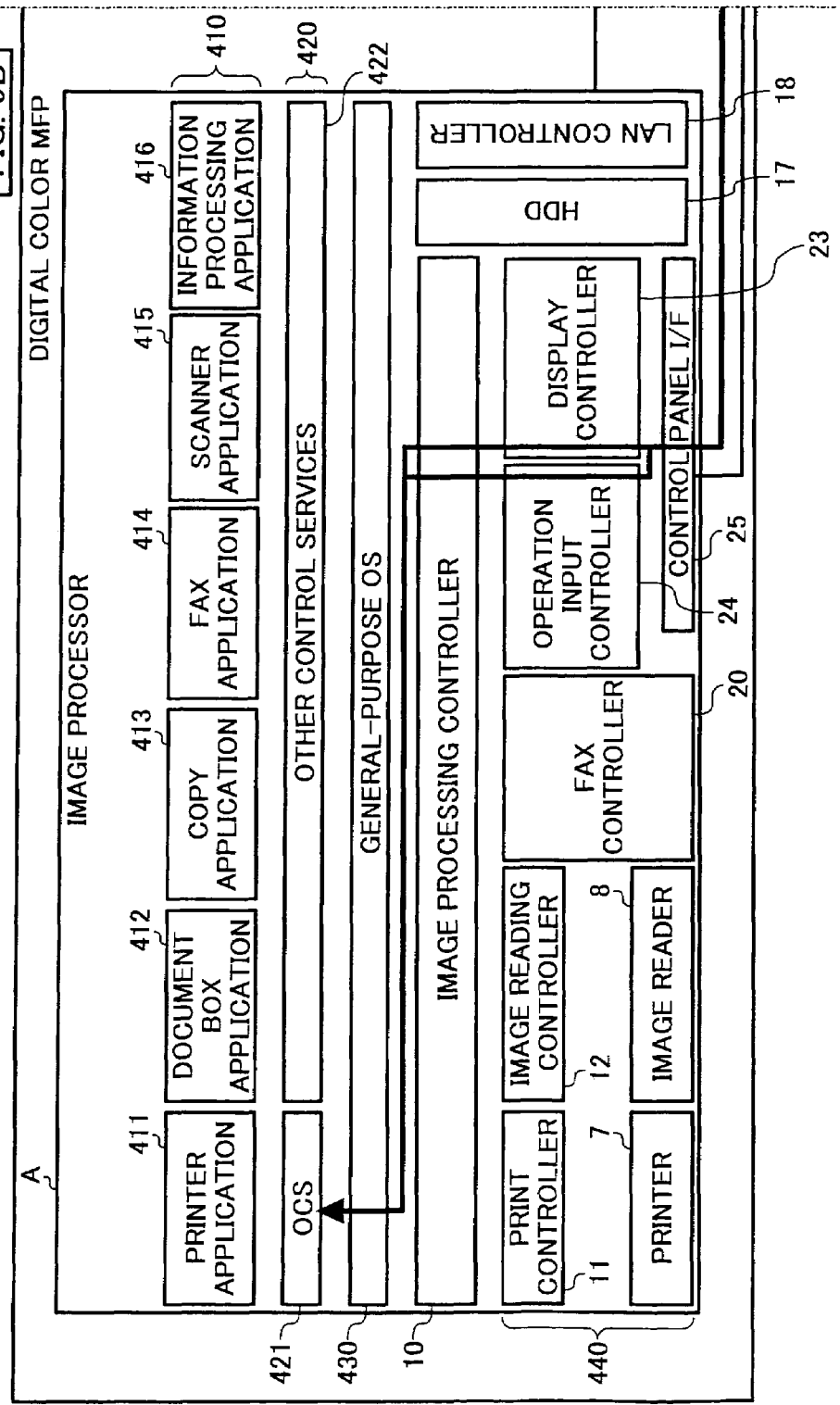
FIG. 9 is a block diagram of a data flow between an operation input device GUI (graphical user interface), an OCS driver, and an OCS when data is displayed on an operation input device or data is input through the operation input device.
Figure 9B:
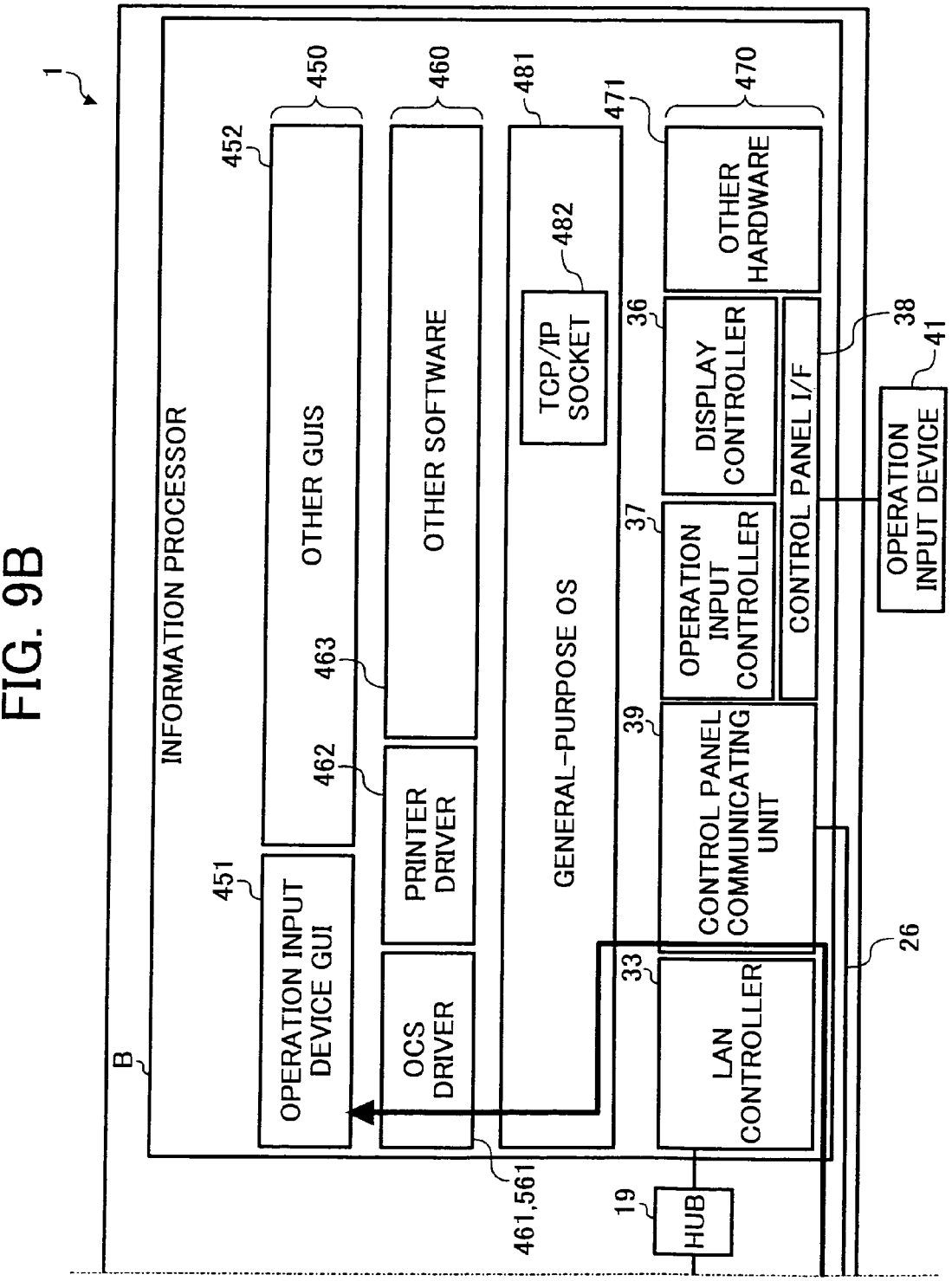

FIG. 9 is a block diagram of a data flow between the operation input device GUI 451, the OCS driver 461, and the OCS 421 when data is displayed on the operation input device 41 or data is input through the operation input device 41. The image-display control signal from the application of the image processor A is transferred from the OCS 421 to the control panel communicating unit 39 through the display controller 23, the control panel I/F 25, and the communication cable 26. The image-display control signal is then input to the OCS driver 461 and the operation input device GUI 451 to be displayed on the operation input device 41. The input control signal input through the operation input device 41 is input from the operation input device GUI 451 to the OCS driver 461, and then transferred to the image processor A through the control panel communicating unit 39 and the communication cable 26. The input control signal is then input to the OCS 421 through the control panel I/F 25 and the display controller 23 to be transferred to the applications by the OCS 421.

The display/output process and the input process of data to the operation input device of the MFP 1 are explained below. The functions included in the image processor A of the MFP 1 are the same as those in the conventional MFP, and therefore, explanation thereof is omitted. The process specific to the embodiment, of various operational processes that are executed by the CPU 31 of the information processor B according to an application program that operates on the OS, is explained below.

Figure 10:
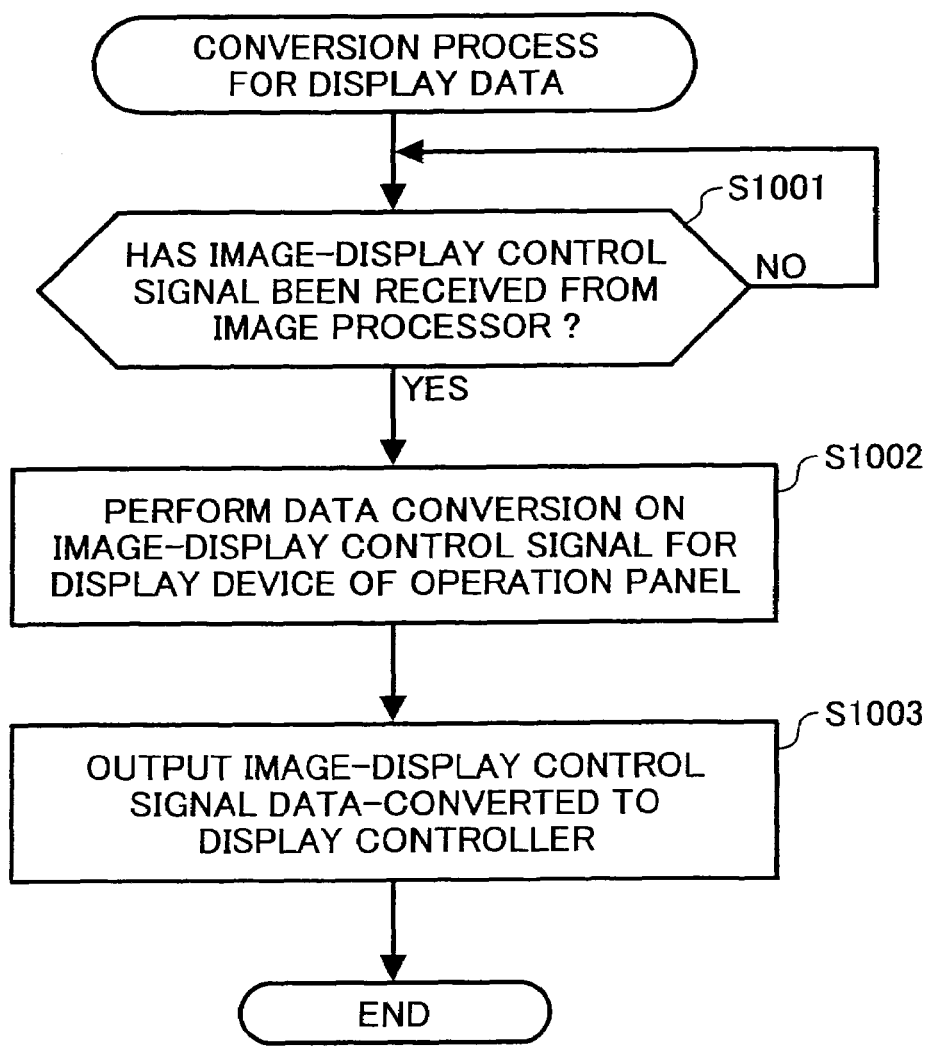
FIG. 10 is a flowchart of a flow of a conversion process for display data.

The conversion process for display data executed by the OCS driver 461 is explained below. FIG. 10 is a flowchart of a flow of the conversion process for display data. The OCS driver 461 of the information processor B receives an image-display control signal output from the image processor A (Yes (Y) at step S1001: image-display control signal receiver). The OCS driver 461 then performs data conversion on the image-display control signal to data for the display device 40 of the operation panel P (step S1002: display-device data converter). The conversion process for display data is realized by generating data for the image-display control signal as one frame of a multi-window in the display device 40 when the information processor B operates by the general-purpose OS in a multi-window display.

Figure 11:
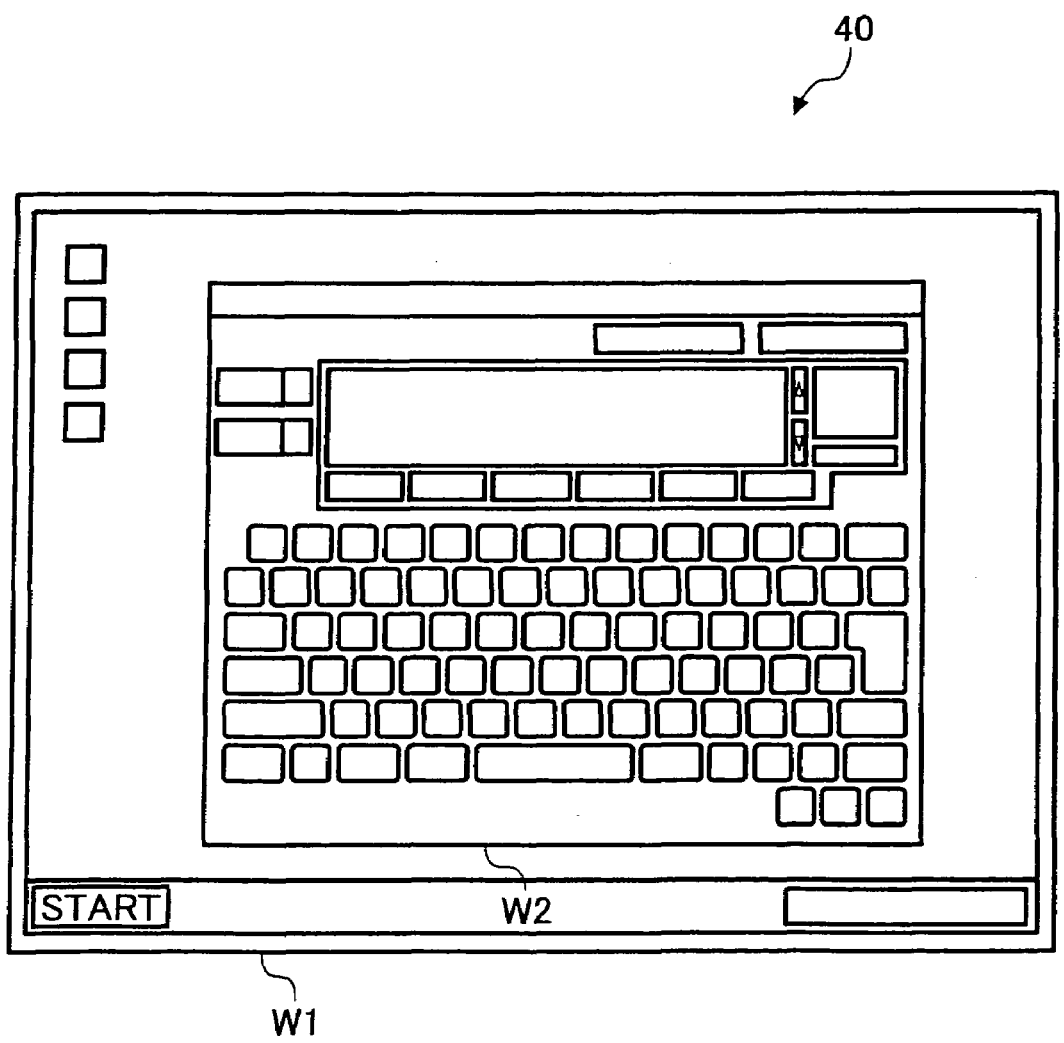
FIG. 11 is a plan view of a display example in an operation panel.

When the conversion process for display data is finished, the image-display control signal data-converted is output to the display controller 36 (step S1003: image-display control signal output unit) to be displayed on the display device 40 of the operation panel P. FIG. 11 is a plan view of a display example in the operation panel P. A window W1 of the general-purpose OS operating in the information processor B is displayed in the display device 40, and a window W2 that serves as an operation input screen in the image processor A is displayed in the window W1. Consequently, the operation panel P of the information processor B can be used also in the image processor A, thus, realizing a display-device sharing unit.

Figure 12:
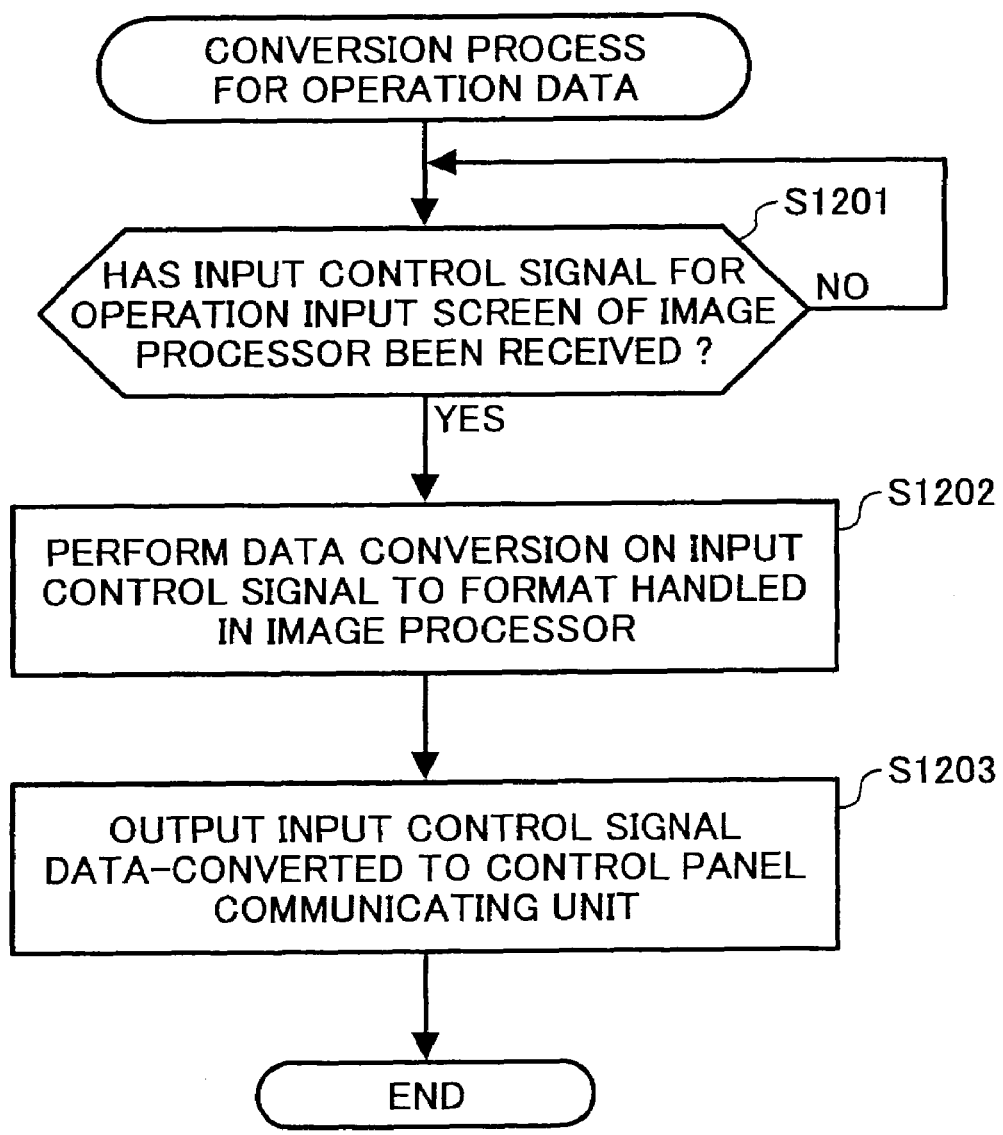
FIG. 12 is a flowchart of a flow of a conversion process for operation data.

The conversion process for operation data executed by the OCS driver 461 of the information processor B is explained below. FIG. 12 is a flowchart of a flow of the conversion process for operation data. The OCS driver 461 receives an input control signal according to setting of a function or an input operation by the operator from the operation input controller 37 when the window W2 is displayed (Y at step S1201: input control signal receiver). The OCS driver 461 then performs data conversion on the input control signal to a format according to specifications of the image processor A (step S1202: data converter). The reason that the data conversion is performed is because if the window W2 is displayed on the display device 40 of the operation panel P, position coordinates on the operation input device 41 (touch panel 41a) corresponding to buttons in the window W2 do not coincide with position coordinates corresponding to buttons held in the image processor A. The reason is that the image processor A inherits data (position coordinates corresponding to the buttons or the like) for using a dedicated operation panel, as it is.

The data conversion is performed by previously providing a conversion table T as shown in FIG. 13 for each screen so that both data are coincident with each other. In other words, in the conversion table T, a panel address (position coordinates) of a button when the image processor A uses the dedicated operation panel is corresponded to a button of the window W2. A touch area of FIG. 13 is used to specify a position of a command button. More specifically, if an address detected when a screen number is 1 is in a range of "WXA00" to "WXA11", a touch panel address is determined as "WXA00", and a button operated is "XA00". The CPU 31 of the information processor B converts this button "XA00" to a touch panel address "XA00" in the image processor A.

When such data conversion is finished, the input control signal data-converted is output to the control panel communicating unit 39 (step S1203: input control signal transfer unit) to be transferred to the image processor A. Consequently, the operation panel P of the information processor B can be used also in the image processor A, thus, realizing an operation-input-device sharing unit.

Therefore, the operation of the image processor A can be performed through the operation panel P of the information processor B by performing the conversion process for display data and the conversion process for operation data.

Figure 14:
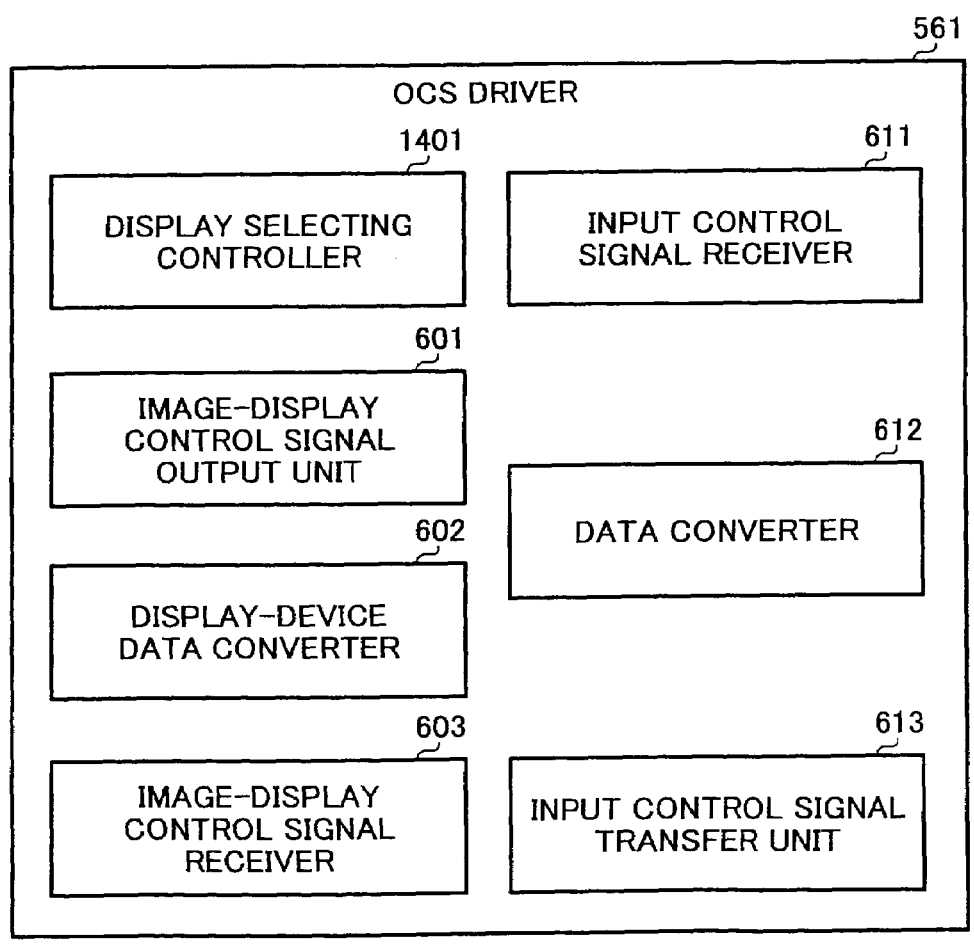
FIG. 14 is a block diagram of a functional configuration of the OCS driver when W1 and W2 are selectably displayed.

As shown in FIG. 11, in this embodiment, the window W2 that serves as the operation input screen in the image processor A is displayed in the window W1 of the general-purpose OS operating in the information processor B. However, the window W1 and the window W2 can be selectively displayed as completely different screens. FIG. 14 is a block diagram of a functional configuration of an OCS driver 561 when W1 and W2 are selectively displayed. The OCS driver 561 further includes a display selecting controller 1401, by which the window W1 and the window W2 are selectively displayed.

Figure 15:
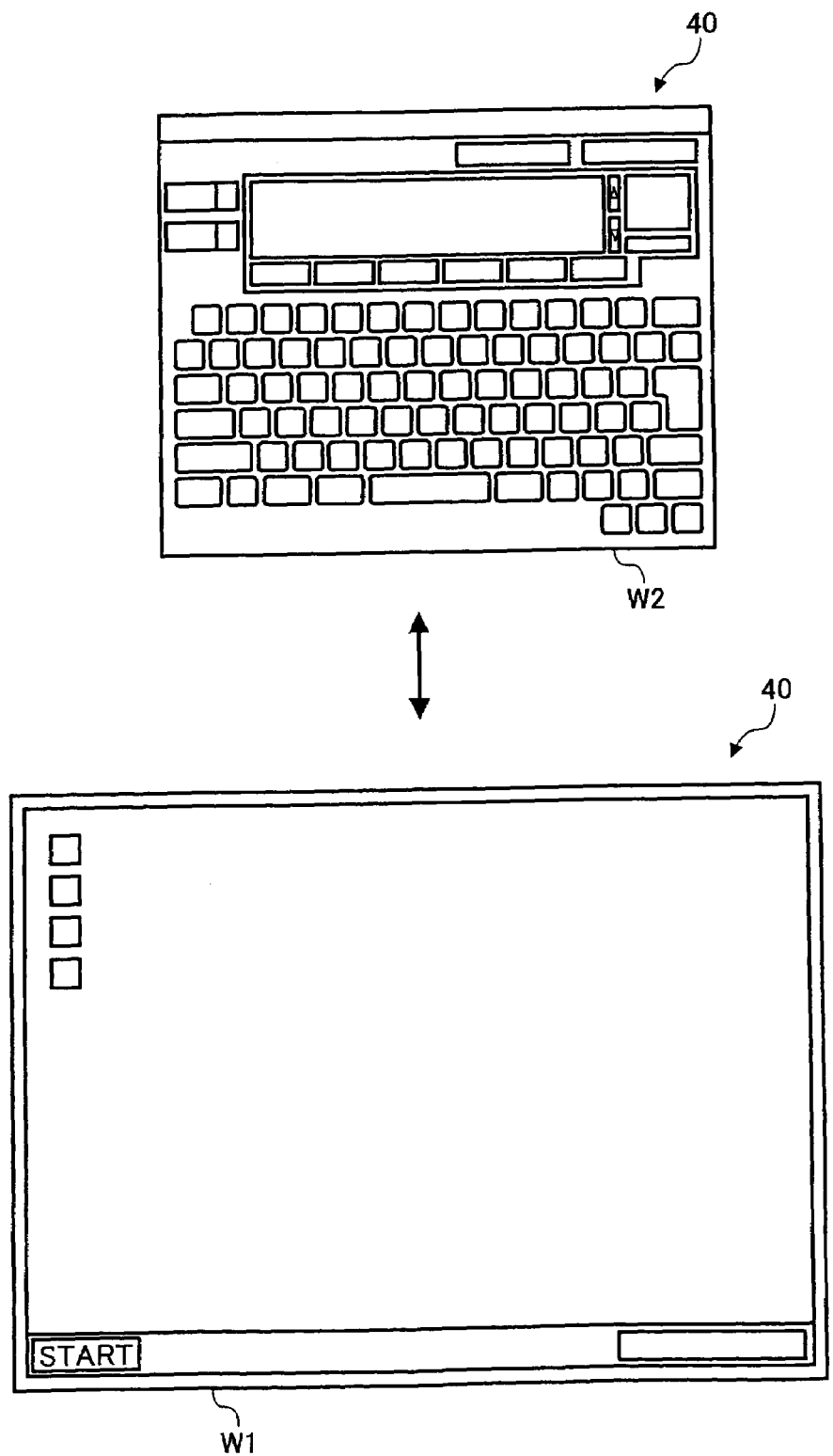
FIG. 15 is a schematic diagram of an example how a window of the general-purpose OS that operates in the information processor and a window that is an operation input screen in the image processor are selectively displayed as completely different screens.

FIG. 15 is a schematic diagram of an example how the window W1 of the general-purpose OS that operates in the information processor B and the window W2 that is the operation input screen in the image processor A are selectably displayed as completely different screens. For example, if a specific key is pressed in the window W1 and the window W2 of FIG. 15, then the display selecting controller 1401 may control so as to select between the window W1 and the window W2.

In the embodiment as explained above, the information processor B that performs a function in a category different from the image processing function performed by the image processor A is controlled by the general-purpose OS. A general-purpose application program can be thereby used as software to make effective use of the image processing function. Therefore, it is possible to facilitate development of software to allow the MFP 1 to perform a function in a category different from the image processing function included in the MFP 1, in addition to the basic image processing function obtained in the MFP 1. Any program developed to make effective use of the image processing function of the image processor A can be sold to outside as a general-purpose application program. Furthermore, an input-output device defined by the general-purpose OS can be also used.

The information processor B and the image processor A are connected to each other through the LAN 2. Therefore, it is possible to make effective use of the image processing function of the image processor A without requiring the presence of the information processing device such as a personal computer on the LAN 2.

The display device 40 of the information processor B also serves as the display device of the image processor A, and the operation input device 41 of the information processor B also serves as the operation input device of the image processor A, which makes it possible to achieve space saving and cost reduction.

Figure 16:
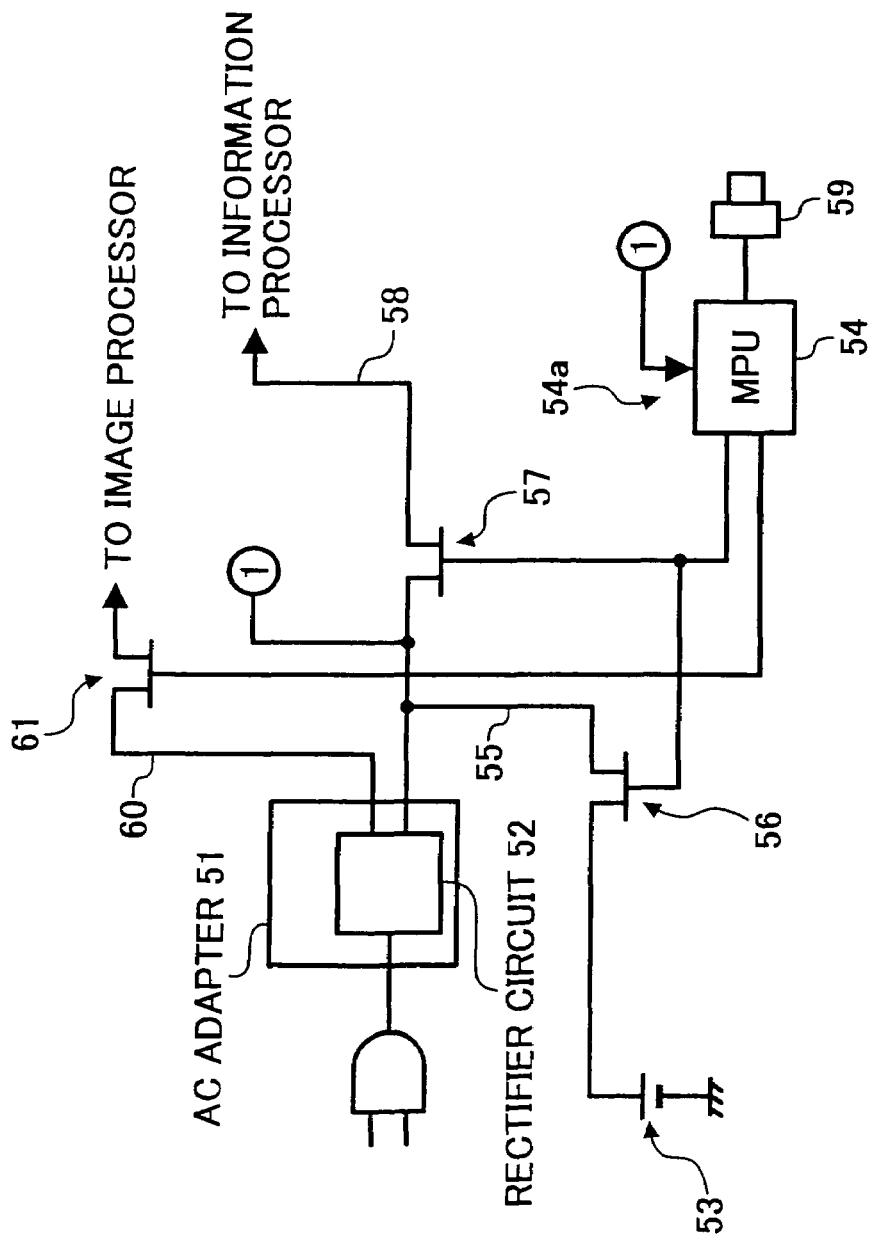
FIG. 16 is a circuit diagram of a power source system for the digital color MFP.

A power source system of the MFP 1 according to the embodiment is explained below. FIG. 16 is a circuit diagram of the power source system for the MFP 1. An alternating current (AC) adapter 51 is a first power source, and includes a rectifier circuit 52 that is supplied with a commercially available AC power (hereinafter, "AC power") to generate DC power. A charging capacitor 53 is a second power source, and is a charger that is connected at its positive side to the output side of the rectifier circuit 52 to be charged with the DC power output from the rectifier circuit 52. The AC adapter 51 supplies power to the image processor A through a line 60. The line 60 is provided with a switching element 61 that is formed of a semiconductor device such as a metal oxide semiconductor field-effect transistor (MOSFET) that opens and closes the line.

A microprocessor unit (MPU) 54 manages the power source system of the information processor B that is an information processing terminal and of the image processor A that is an image forming apparatus. The output side of the rectifier circuit 52 and the positive side of the charging capacitor 53 are connected in parallel with a power source input unit 54a from the line 55 that connects between the rectifier circuit 52 and the charging capacitor 53. The MPU 54 is thereby possible to be supplied with power from both the rectifier circuit 52 and the charging capacitor 53.

A switching element 56 formed of a semiconductor device such as MOSFET connects between the output side of the rectifier circuit 52 and the positive side of the charging capacitor 53., and opens and closes the line 55 according to a control signal output from the MPU 54. The line 55 connects between the output side of the rectifier circuit 52 and the power input unit 54a of the MPU 54.

A switching element 57 formed of a semiconductor device such as MOSFET connects between the output side of the rectifier circuit 52 and the positive side of the charging capacitor 53, and opens and closes a line 58 according to a control signal output from the MPU 54. The line 58 is used to supply power to the information processor B.

Reference sign 59 represents an operation switch for turning on or off a main power source of the MFP 1. The MPU 54 can detect the operation of the operation switch 59.

Figure 17:
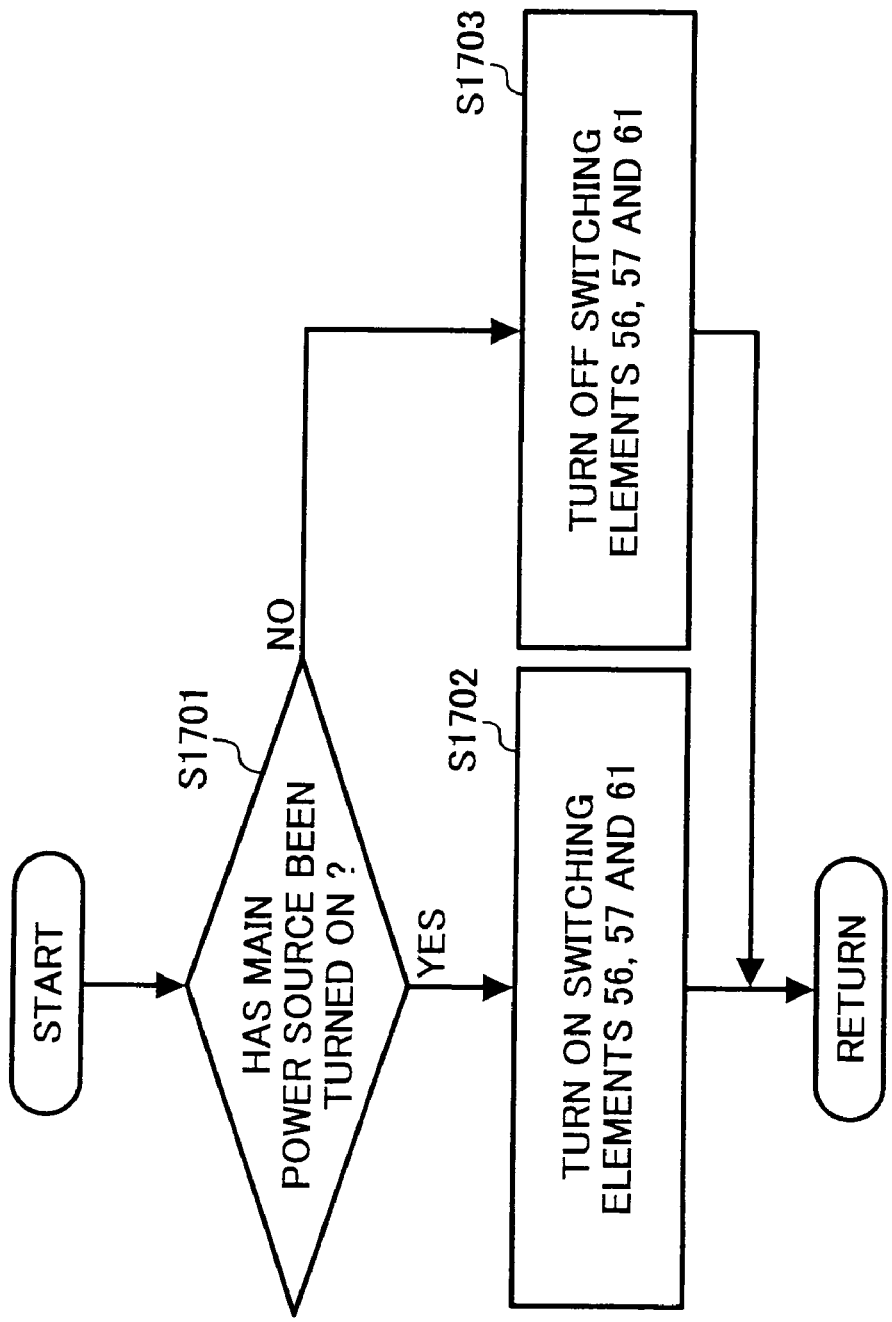
FIG. 17 is a flowchart of operation of the circuit of the power source system.

The operation of the circuit of FIG. 16 is explained below. FIG. 17 is a flowchart of the circuit operation of the power source system. When the MFP 1 is supplied with the AC power, the MPU 54 is supplied with DC power obtained by rectifying the AC power in the rectifier circuit 52 to manage the power source of the MFP 1 irrespective of whether the operation switch 59 is turned on.

The user turns on the operation switch 59 to use the MFP 1. At this time, the MPU 54 detects that the operation switch 59 has been turned on (Y at step S1701), turns on the switching elements 56, 57, and 61 (step S1702), and closes the lines 55, 58, and 60. When the operation switch 59 is not turned on (No (N) at step S1701), the MPU 54 turns off the switching elements 56, 57, and 61 (step S1703), and opens the lines 55 and 58.

The operation switch 59 is switched on to turn on the switching elements 56, 57, and 61 and to close the lines 58 and 60, which allows DC power to be supplied to the image processor A and the information processor B through the rectifier circuit 52 (actually, a DC-DC converter (not shown) generates DC power in various levels to be supplied to each units.). The image processor A is thereby ready to operate, and the CPU 31 starts up the OS and the information processor B is thereby ready to operate. By opening the line 55, the charging capacitor 53 is charged.

As explained above, the MFP 1 operates generally by the power of the AC power source, but if a user unintentionally pulls out a plug or the power is interrupted while the operation switch 59 is turned on, that is, if the AC power is abruptly interrupted, potential at the output side of the rectifier circuit 52 becomes zero. Therefore, the charging capacitor 53 is caused to discharge to supply power to the MPU 54, and the MPU 54 keeps the switching elements 56 and 570N while the operation switch 59 is kept ON (step S1702) to maintain a close state of the lines 55 and 58. Therefore, the power of the charging capacitor 53 is kept supplied to the MPU 54 to allow it to maintain its operation.

If the information processor B is during operation, the information processor B can continue the operation by this power, which makes it possible to prevent events such that the power is interrupted before the OS is finished in the information processor B, and to prevent occurrence of data corruption or the like. In this case, a power supply to the image processor A is interrupted, and therefore, the power is supplied only to the information processor B.

However, the case where the charging capacitor 53 functions as a power source for emergency is limited to a case where the AC power is interrupted in a state where the operation switch 59 is turned on. Even if the charging capacitor 53 is used in a large-scaled system such as the MFP 1, there is no need to provide a large-scaled capacitor as the charging capacitor 53, which makes it possible to reduce manufacturing costs of the charging capacitor 53 and its peripheral device.

Figure 18:
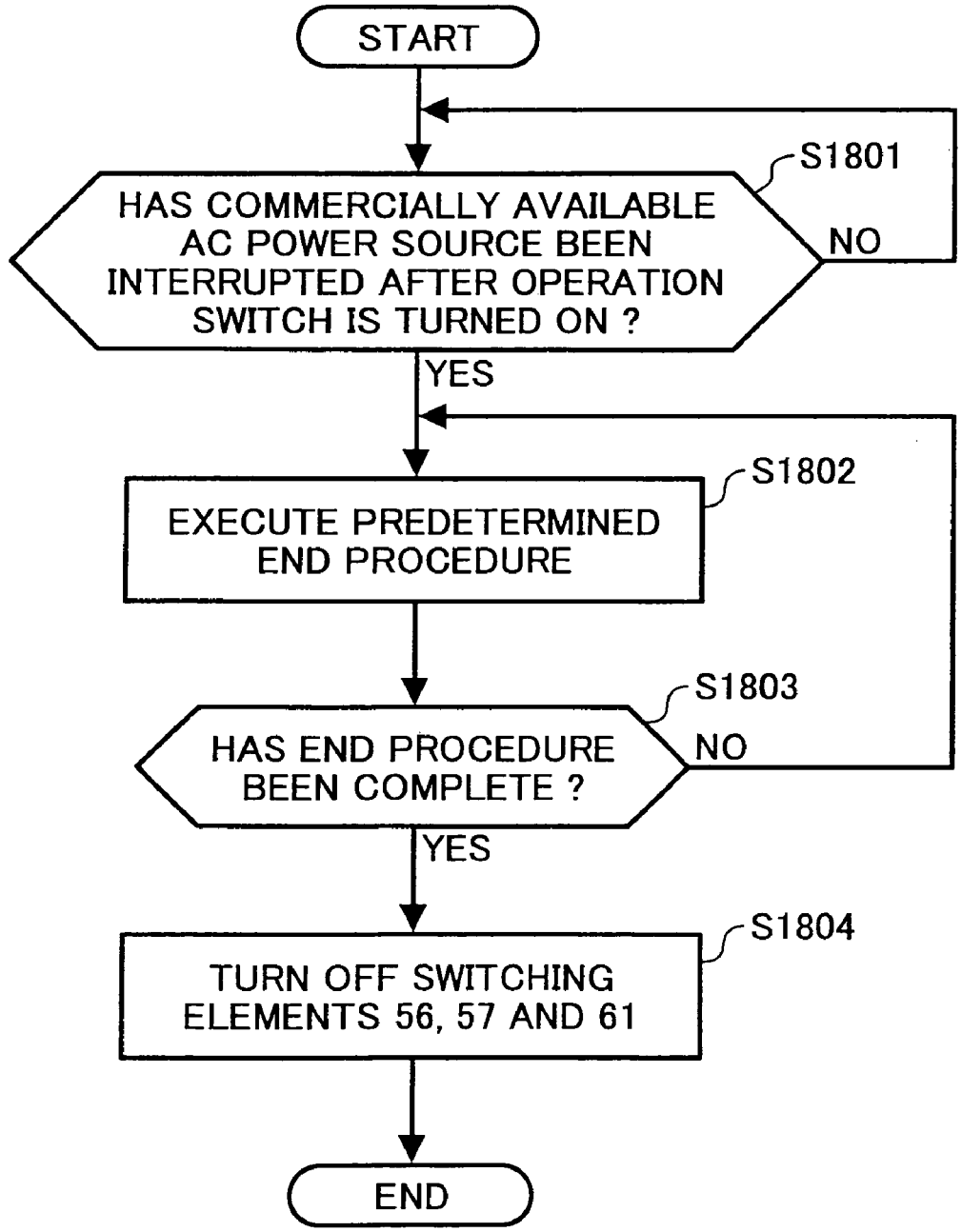
FIG. 18 is a flowchart of a process procedure executed by the information processor when a commercially available AC power is interrupted and a charging capacitor is used as a backup power source.

FIG. 18 is a flowchart of a process procedure executed by the information processor B when the AC power is interrupted and the charging capacitor 53 is used as a backup power source.

The CPU 31 detects that the operation switch 59 has been turned on and detects that the AC power has been interrupted, and the detection can be determined by detecting that a voltage of a voltage sensor (not shown) becomes zero (Y at step S1801). The voltage sensor detects a voltage of an AC power source provided in the AC adapter 51. The CPU 31 then executes a predetermined end procedure such as storage of jobs performed by the information processor B in the storage device 34 (step S1802). During execution of the storage process, a power supply from the charging capacitor 53 to the information processor B is maintained. But when the predetermined end procedure is complete (Y at step S1803), the MPU 54 is instructed to turn off the switching elements 56, 57, and 61 (step S1804).

Therefore, the backup power is maintained by the charging capacitor 53 until the predetermined end procedure is completed. It is thereby possible to prevent inconvenience such as system corruption in the information processor B, and thereafter, the backup power can be turned off as well.

According to the MFP 1 of the embodiment, if a power supply from the first power source such as the AC power source that supplies power to the MFP 1 is interrupted, the second power source supplies drive power only to the information processing terminal. Therefore, it is possible to supply power singly to the information processing terminal to allow it to operate after the power supply from the AC power source is interrupted.

Figure 19:
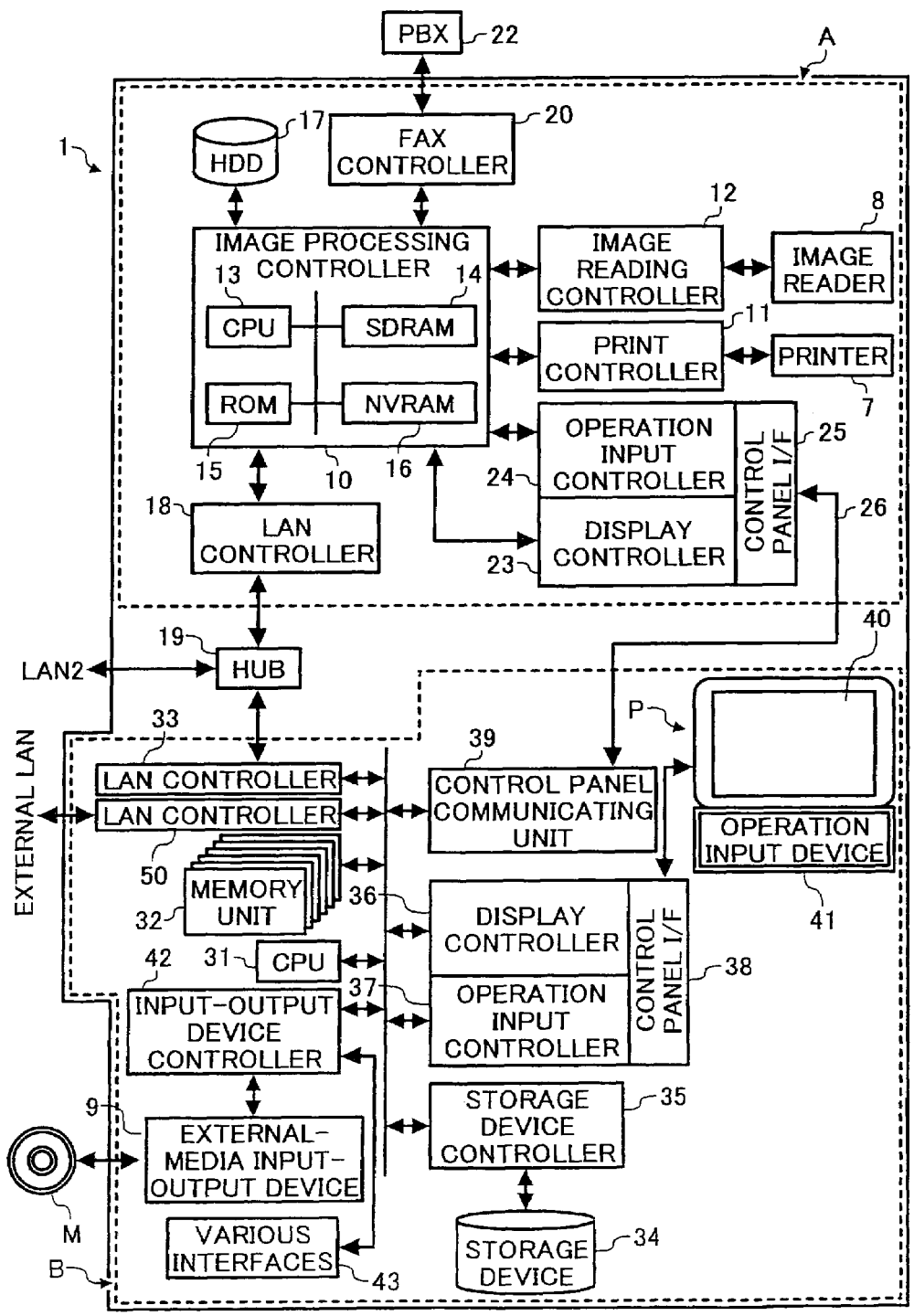
FIG. 19 is a block diagram of a first modification of the digital color MFP.

A first modification of the MFP 1 is explained below. As shown in FIG. 19, the MFP 1 as the first modification includes a second LAN controller 50 in the information processor B in addition to the configuration of the information processor B. The reason that a plurality of LAN controllers 33 and 50 are provided in the information processor B is because a routing function that is generally performed when two systems of networks are present can be performed in the MFP 1. Therefore, the second LAN controller 50 is connected to an external LAN that constructs an extranet together with the LAN 2. The information processor B of the MFP 1 includes a function of performing internal processing (realized by known communications management software) to communications from the external LAN and performing connection to the LAN 2. Thus, the function of communications management is enhanced to allow a higher level of security against unauthorized access to be ensured.

Figure 20:
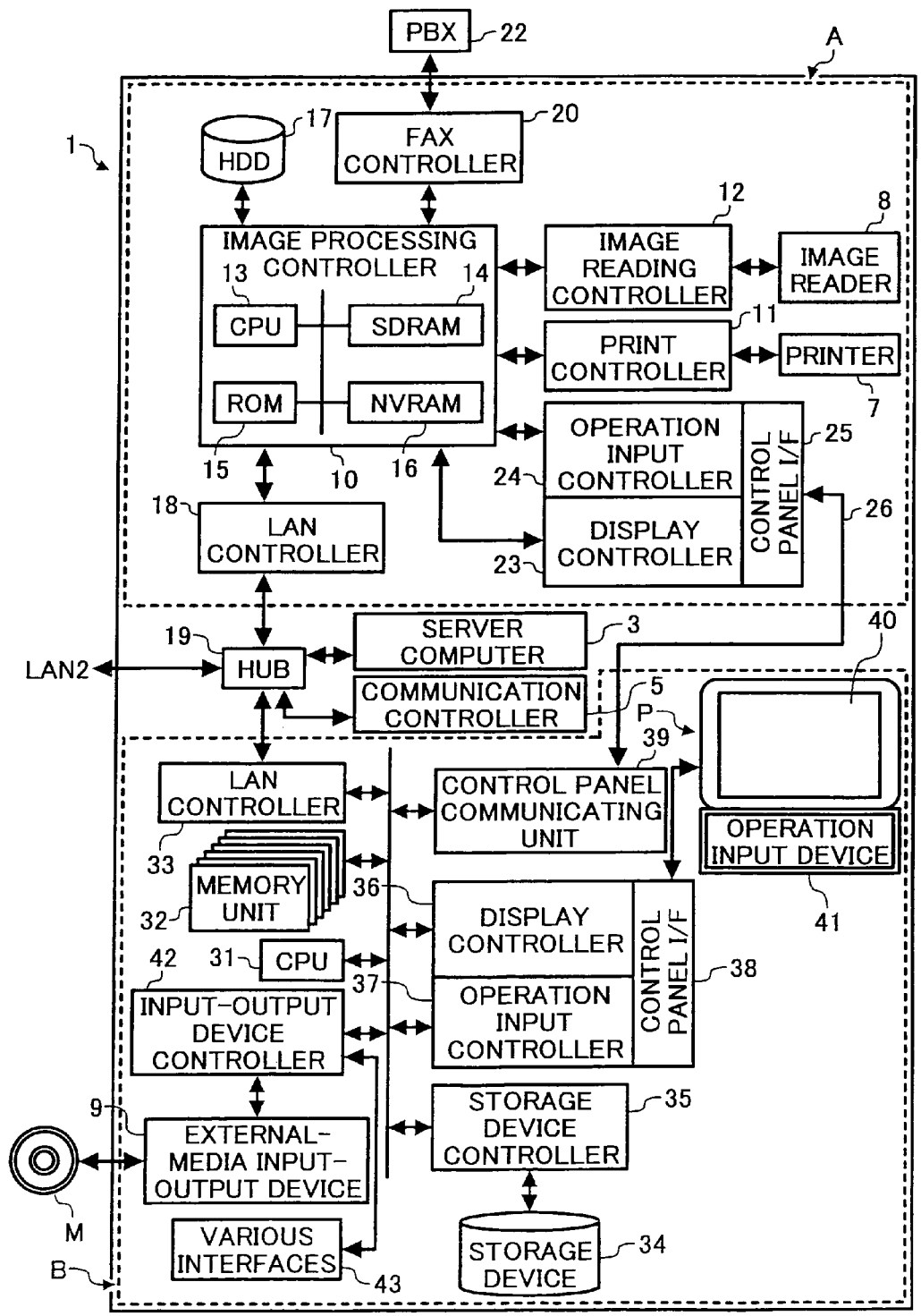
FIG. 20 is a block diagram of a second modification of the digital color MFP.

A second modification of the MFP 1 is explained below. Although the server computer 3 and the communication controller 5 have been provided outside the MFP 1, the MFP 1 as the second modification is configured to provide these two components inside of the MFP 1 in addition to the configuration thereof, as shown in FIG. 20. In other words, one network is constructed inside the MFP 1. When the communication controller 5 is connected to the Internet network 6, the server computer 3 can also serve as a Web server. As a result, the units are separated on the network, which allows security to be ensured. Moreover, the information processor B and the server computer 3 may be operated by different OSs. For example, any OS excellent in network management can be selected for the server computer 3.

In the embodiment, although the example of application of the MFP as the image processing apparatus is explained, the present invention is not limited to the example. Therefore, an image processing apparatus as follows may be used. That is, the image processing apparatus has at least one of the image forming unit (printer 7) and the image reading unit (image reader 8), each of which is connected to the server computer 3 and the client computer 4 through the LAN 2. The MFP 1 may be used in, for example, a digital monochrome MFP, a monochrome copying machine, a color copying machine, a scanner, a monochrome printer, and a color printer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   an image processor that performs an image processing and includes at least one of an image forming unit and an image reading unit, wherein the image forming unit forms an image on a medium based on image data and outputs the image, and the image reading unit reads a document image;
   an information processor that is controlled by an operating system and performs an information processing function different from the image processing function; and
   a line concentrator disposed inside the image processing apparatus,
   wherein the information processor and the image processor are each connected to different network controllers having different network addresses which are connected to a communication network through the line concentrator, and
   wherein the image processor, the information processor and the line concentrator are disposed inside the image processing apparatus.

2. The image processing apparatus according to claim 1, wherein the general-purpose operating system is an operating system that is operable on a personal computer.

3. The image processing apparatus according to claim 1, further comprising a cable, by which the information processor and the image processor are connected to each other.

4. The image processing apparatus according to claim 3, wherein data transmission and data reception are performed between the information processor and the image processor via the cable according to Transmission control protocol/Internet protocol (TCP/IP) communication protocols.

5. The image processing apparatus according to claim 3, wherein the cable is based on Ethernet.

6. The image processing apparatus according to claim 1, wherein the information processor and the image processor are connected to each other through a port that is inaccessible from an external device.

7. The image processing apparatus according to claim 4, wherein the cable is based on serial interface.

8. The image processing apparatus according to claim 1, wherein the image processor further includes an information processing application that performs processing as an interface of data transmission and data reception with the information processor.

9. The image processing apparatus according to claim 1, wherein the information processor further includes
   a display device that displays an image related to process control in the information processor; and
   a display-device sharing unit that allows an image related to process control in the image processor to be displayed on the display device.

10. The image processing apparatus according to claim 9, wherein the display-device sharing unit includes
    an image-display control signal receiver that receives an image-display control signal output from the image processor through the communication means;
    a display-device data converter that performs data conversion on the image-display control signal received, the data conversion being performed for the display device; and
    an image-display control signal output unit that outputs the image-display control signal data-converted to the display device.

11. The image processing apparatus according to claim 10, wherein the image processor further includes
    a display controller that transfers the image related to the process control as the image-display control signal to the information processor according to a request from an application that performs image processing.

12. The image processing apparatus according to claim 1, wherein the information processor includes
    an operation input device that accepts various inputs related to process control in the information processor; and
    an operation-input-device sharing unit that allows various inputs related to process control in the image processor to be input through the operation input device.

13. The image processing apparatus according to claim 12, wherein the operation-input-device sharing unit includes
    an input control signal receiver that receives an input control signal through the operation input device;
    a data converter that performs data conversion on the input control signal received to a format according to specifications of the image processor; and
    an input control signal transfer unit that transfers the input control signal data-converted to the image processor through the communication means.

14. The image processing apparatus according to claim 13, wherein the image processor further includes
    an input controller that receives the input control signal transferred, and transmits the input control signal to an application that performs image processing.

15. The image processing apparatus according to claim 1, further comprising:
    a first power source that supplies drive power common to the image processor and the information processor; and
    a second power source that supplies drive power only to the information processor if a power supply from the first power source to the image processor and the information processor is interrupted.

16. The image processing apparatus according to claim 1, further comprising:
    a first power source that supplies drive power common to the image processor and the information processor; and
    a second power source that supplies drive power only to the information processor if a power supply from the first power source to the image processor and the information processor is interrupted, the information processor being during operation at a time of the interruption.

17. The image processing apparatus according to claim 16, further comprising:
    a storage unit that stores information on processing executed in the information processor at a time at which the power supply from the first power source to the information processor is interrupted.

18. The image processing apparatus according to claim 17, wherein the second power source supplies drive power to the information processor during a time when the information on the processing executed is stored in the storage unit.

19. The image processing apparatus according to claim 16, wherein the information processor starts executing predetermined end process at a time at which the power supply from the first power source is interrupted, and the second power source supplies drive power to the information processor during a time when the information processor completes the predetermined end process.

20. A computer readable recording medium that stores a computer program which when executed makes an image forming apparatus perform a method comprising:

controlling an information processor by an operating system to perform an information processing function in the information processor, the information processing function being different from an image processing function, the image processing function being performed in an image processor that includes at least one of an image forming unit and an image reading unit, the image forming unit forming an image on a medium based on image data and outputting the image, the image reading unit reading a document image, and the information processor and the image processor each being connected to different network controllers having different network addresses which are connected to a communication network through a line concentrator, the image processor, the information processor and the line concentrator being disposed inside the image processing apparatus;

receiving an image-display control signal output from the image processor;

performing data conversion on the image-display control signal received, the data conversion being performed for a display device; and outputting the image-display control signal data-converted to the display device.

21. A computer readable recording medium that stores a computer program which when executed makes an image forming apparatus perform a method comprising:

controlling an information processor by an operating system to perform an information processing function in the information processor, the information processing function being different from an image processing function, the image processing function being performed in an image processor that includes at least one of an image forming unit and an image reading unit, the image forming unit forming an image on a medium based on image data and outputting the image, the image reading unit reading a document image, and the information processor and the image processor each being connected to different network controllers having different network addresses which are connected to a communication network through a line concentrator, the image processor, the information processor and the line concentrator being disposed inside the image processing apparatus;

receiving an input control signal output from an operation input device;

performing data conversion on the input control signal received to a format according to specifications of the image processor; and transferring the input control signal data-converted to the image processor.

* * * * *